United States Patent
Koga et al.

(10) Patent No.: US 12,000,441 B2
(45) Date of Patent: Jun. 4, 2024

(54) VEHICLE CLUTCH CONTROL METHOD AND VEHICLE CLUTCH CONTROL DEVICE

(71) Applicant: Nissan Motor Co., Ltd., Yokohama (JP)

(72) Inventors: Masato Koga, Kanagawa (JP); Takayuki Kagaya, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/032,604

(22) PCT Filed: Nov. 18, 2020

(86) PCT No.: PCT/IB2020/000959
§ 371 (c)(1),
(2) Date: Apr. 19, 2023

(87) PCT Pub. No.: WO2022/106862
PCT Pub. Date: May 27, 2022

(65) Prior Publication Data
US 2023/0392654 A1 Dec. 7, 2023

(51) Int. Cl.
*F16D 48/06* (2006.01)

(52) U.S. Cl.
CPC .......... *F16D 48/06* (2013.01); *F16D 2300/18* (2013.01); *F16D 2500/10412* (2013.01);
(Continued)

(58) Field of Classification Search
CPC ....... F16D 2300/18; F16D 2500/10462; F16D 2500/30406; F16D 2500/70626;
(Continued)

(56) References Cited

U.S. PATENT DOCUMENTS 9,702,420 B2    7/2017  Yoon
9,981,552 B2 *  5/2018  Ogawa ................. B60K 17/344
(Continued)

FOREIGN PATENT DOCUMENTS

CN    111706671 B  * 12/2020
JP    10-246316 A    9/1998
(Continued)

OTHER PUBLICATIONS

Extended European Search Report of Jan. 8, 2024 of corresponding European Patent Application No. 20962336.2.

*Primary Examiner* — Stacey A Fluhart
(74) *Attorney, Agent, or Firm* — Global IP Counselors, LLP

(57) ABSTRACT

A clutch control method is used in a vehicle that has a dog clutch and an engagement sensor, which detects an engagement of a dog clutch. The clutch control method includes executing an engagement of the dog clutch when a magnitude of a differential rotation of the dog clutch is less than or equal to a prescribed value when the engagement sensor is normal and then determining the engagement of the dog clutch using the engagement sensor. The clutch control method further includes setting the differential rotation of the dog clutch to a value larger than the prescribed value when the engagement sensor has failed and then determining the engagement of the dog clutch based on a difference between the differential rotation of the dog clutch at a time of starting the engagement of the dog clutch and the differential rotation of the dog clutch.

4 Claims, 17 Drawing Sheets

(52) U.S. Cl.
CPC ............ *F16D 2500/10462* (2013.01); *F16D 2500/308* (2013.01); *F16D 2500/3109* (2013.01); *F16D 2500/5108* (2013.01)

(58) Field of Classification Search
CPC . F16D 2500/30401; F16D 2500/10406; F16D 2500/502
See application file for complete search history.

(56) References Cited

U.S. PATENT DOCUMENTS

2008/0215221 A1\* 9/2008 Baehr .................. F16D 48/064
701/68
2008/0230345 A1\* 9/2008 Minami ................. F16D 48/06
192/30 W

FOREIGN PATENT DOCUMENTS

| | | |
|---|---|---|
| JP | 11-280895 A | 10/1999 |
| JP | 2006-300285 A | 11/2006 |
| JP | 4010052 B2 | 11/2007 |
| JP | 2015-28359 A | 2/2015 |
| JP | 2018-149968 A | 9/2018 |
| WO | WO-2018037718 A1 \* | 3/2018 ............... B60K 6/36 |

\* cited by examiner

[FIG. 1]
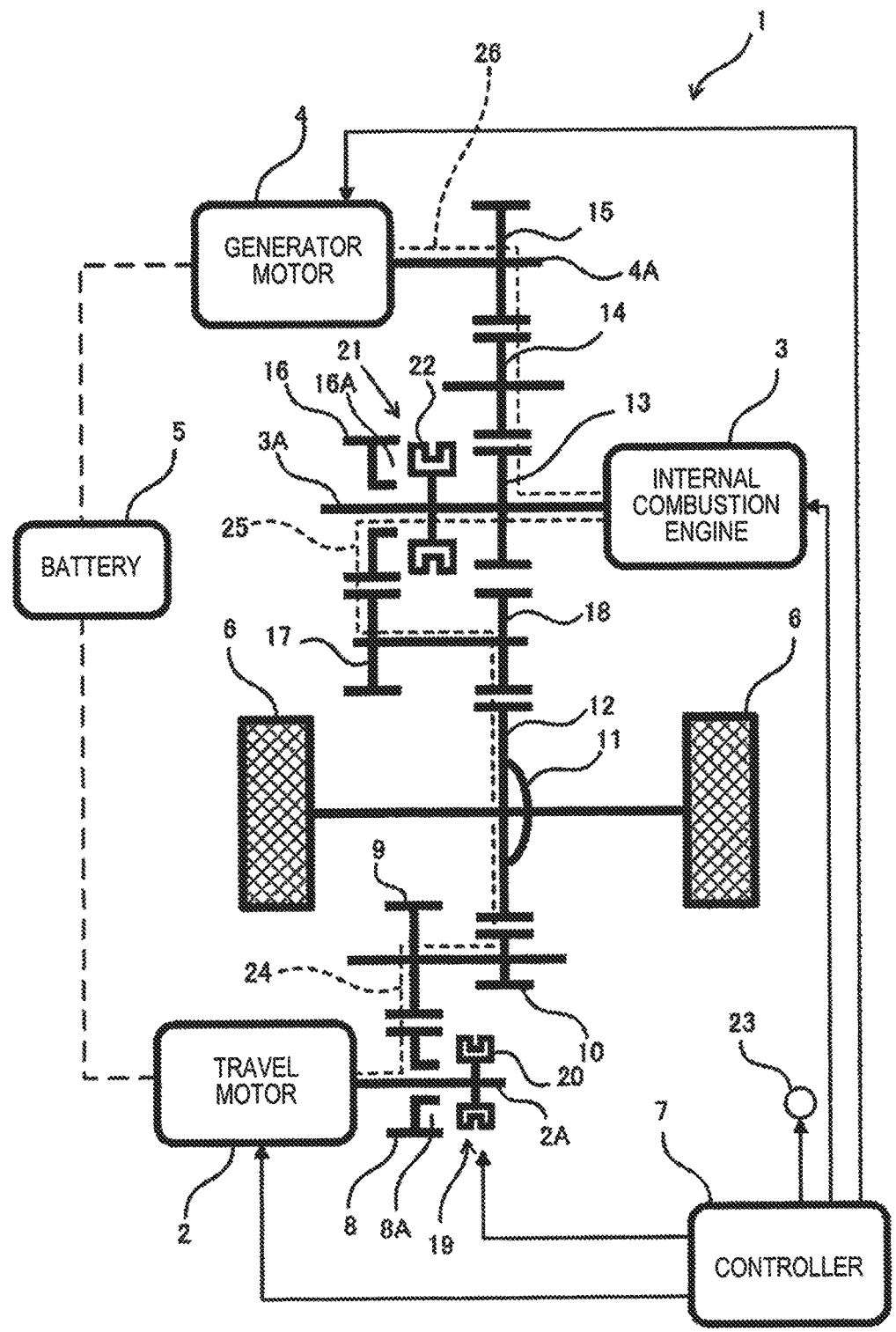

[FIG. 2]
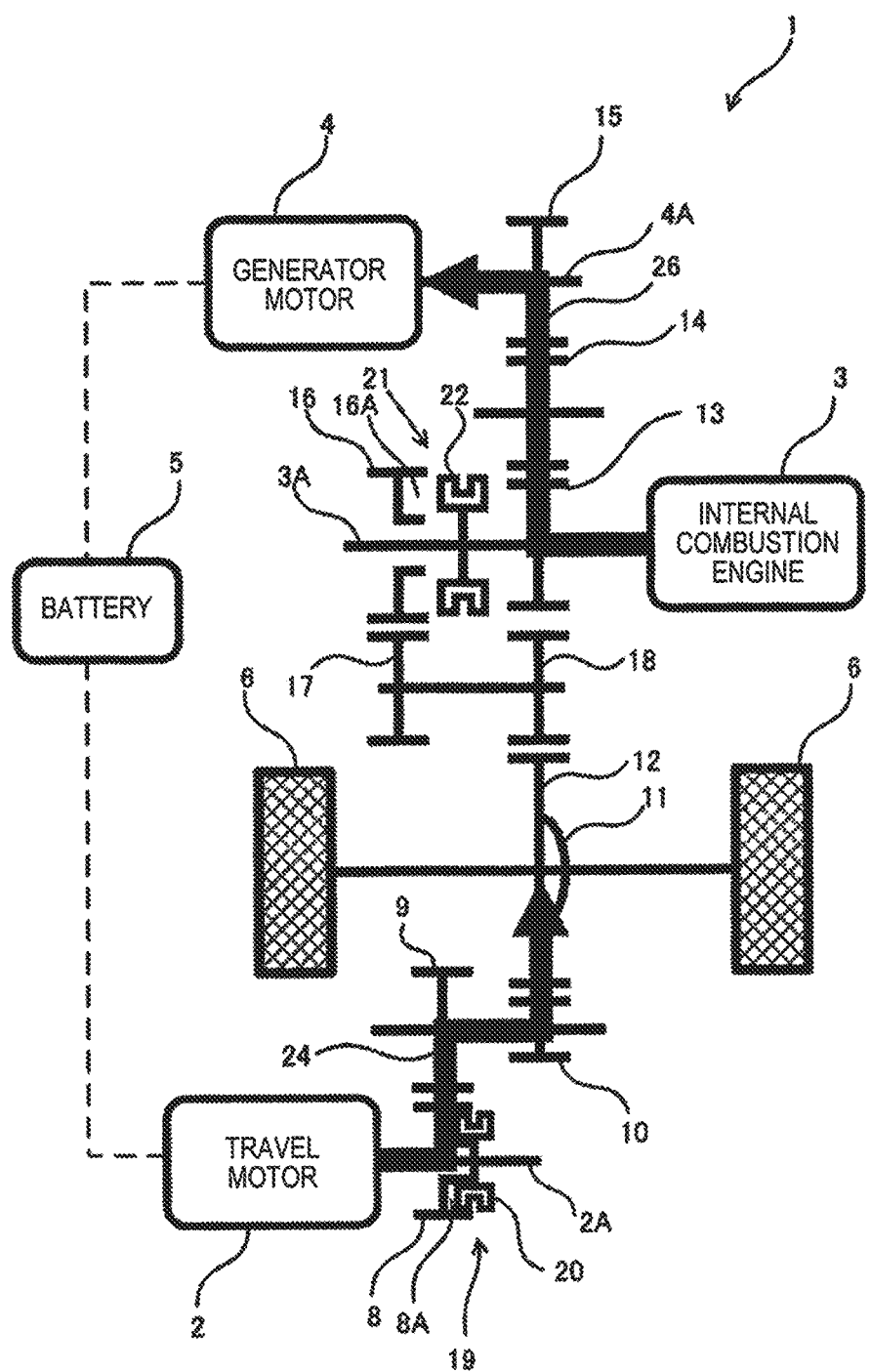

[FIG. 3]
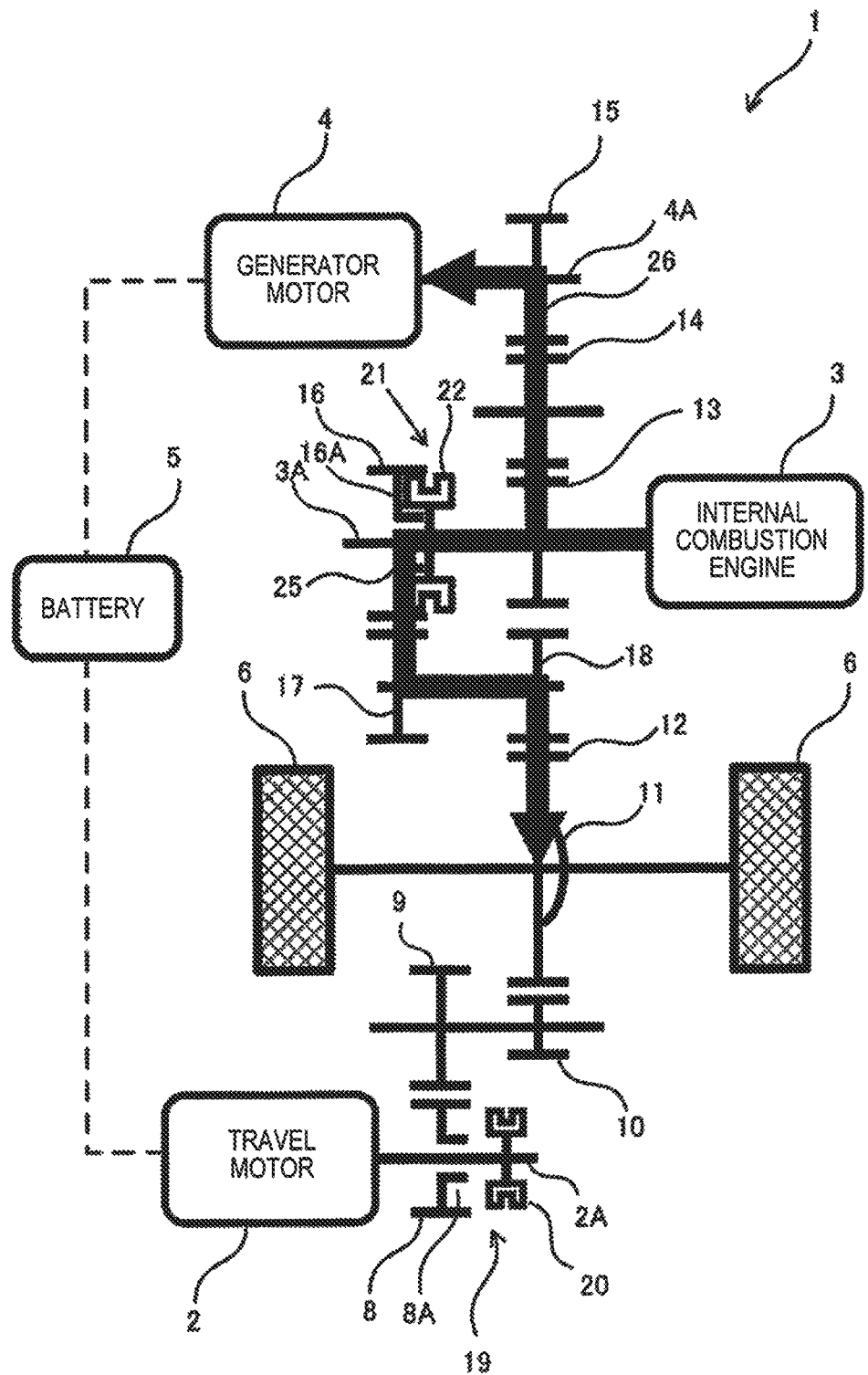

[FIG. 4]
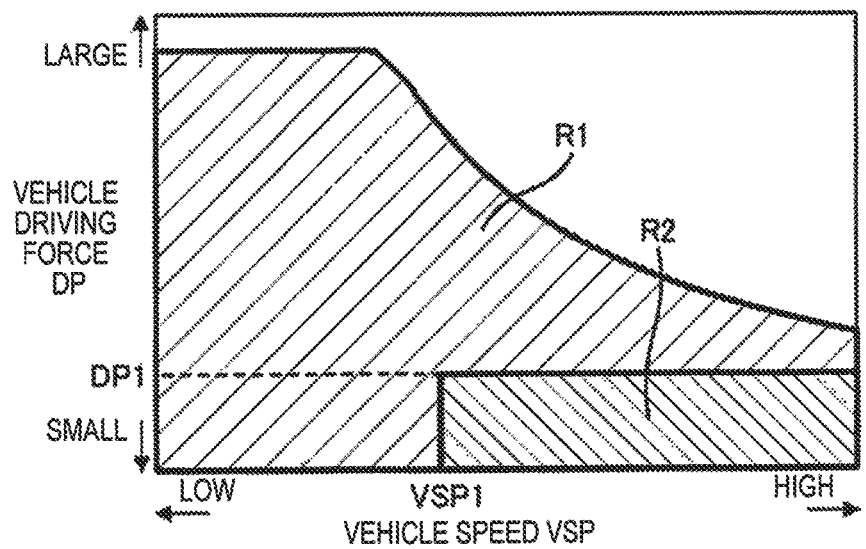
[FIG. 5]
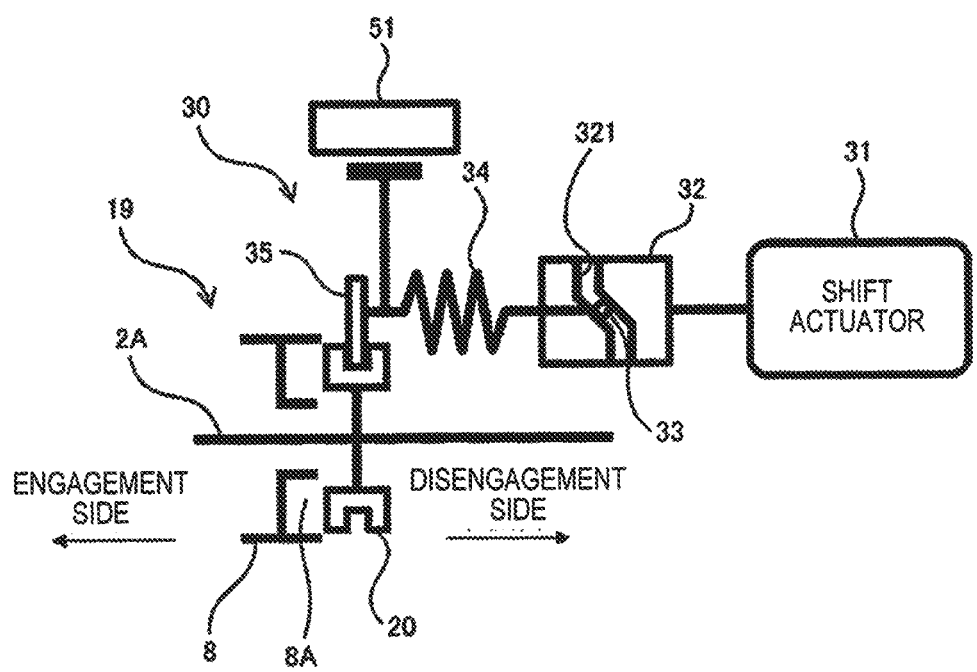

[FIG. 6]
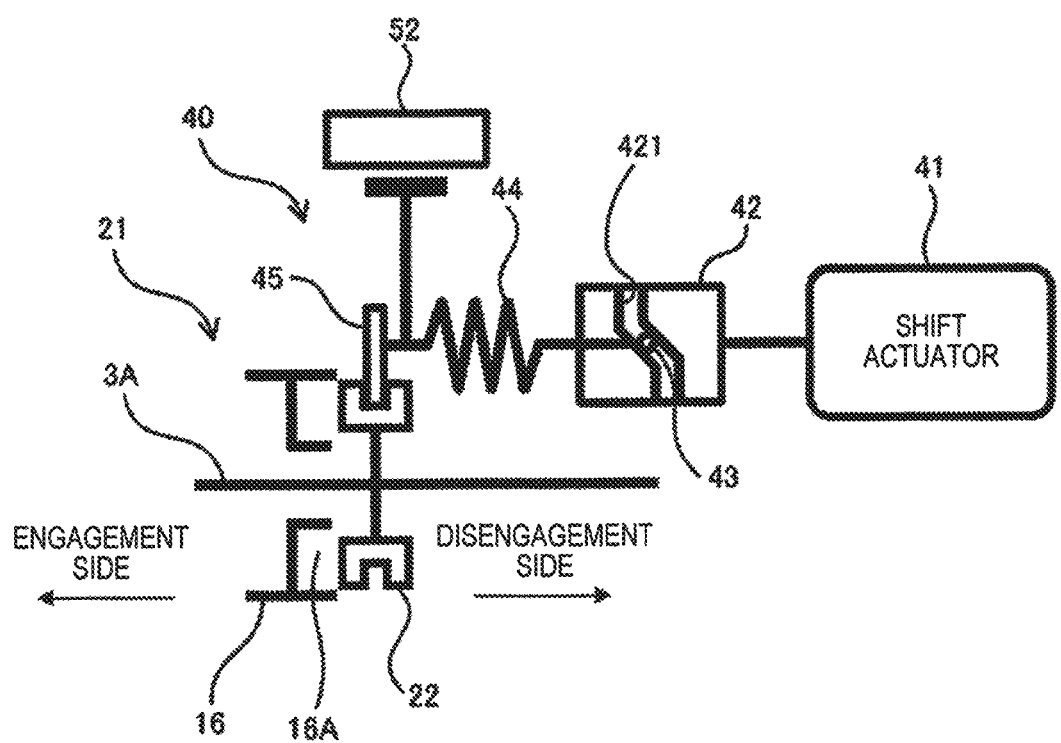

[FIG. 7]
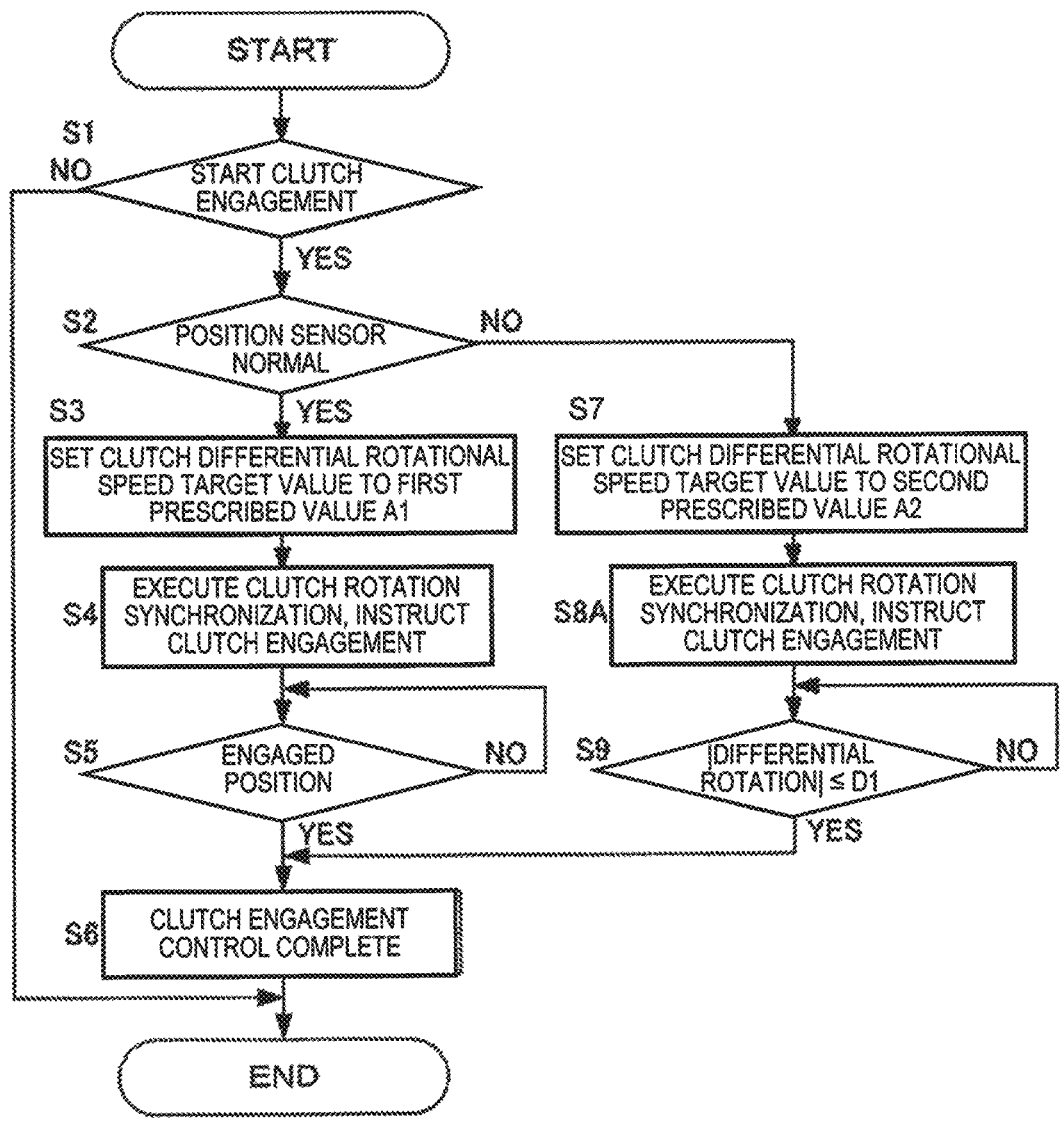
[FIG. 8A]
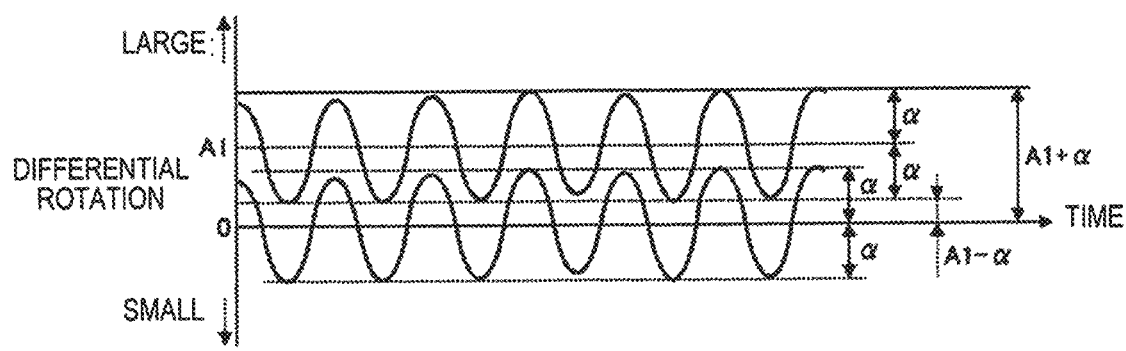

[FIG. 8B]
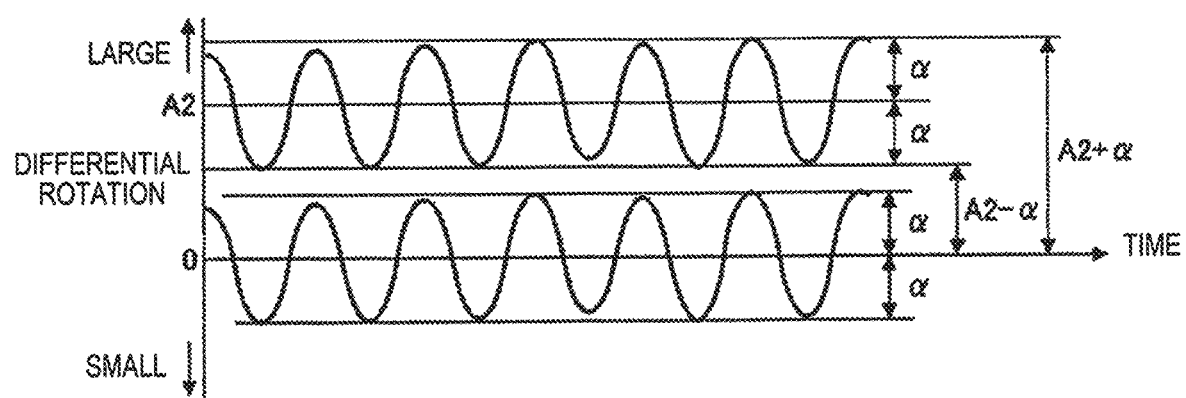

[FIG. 10]
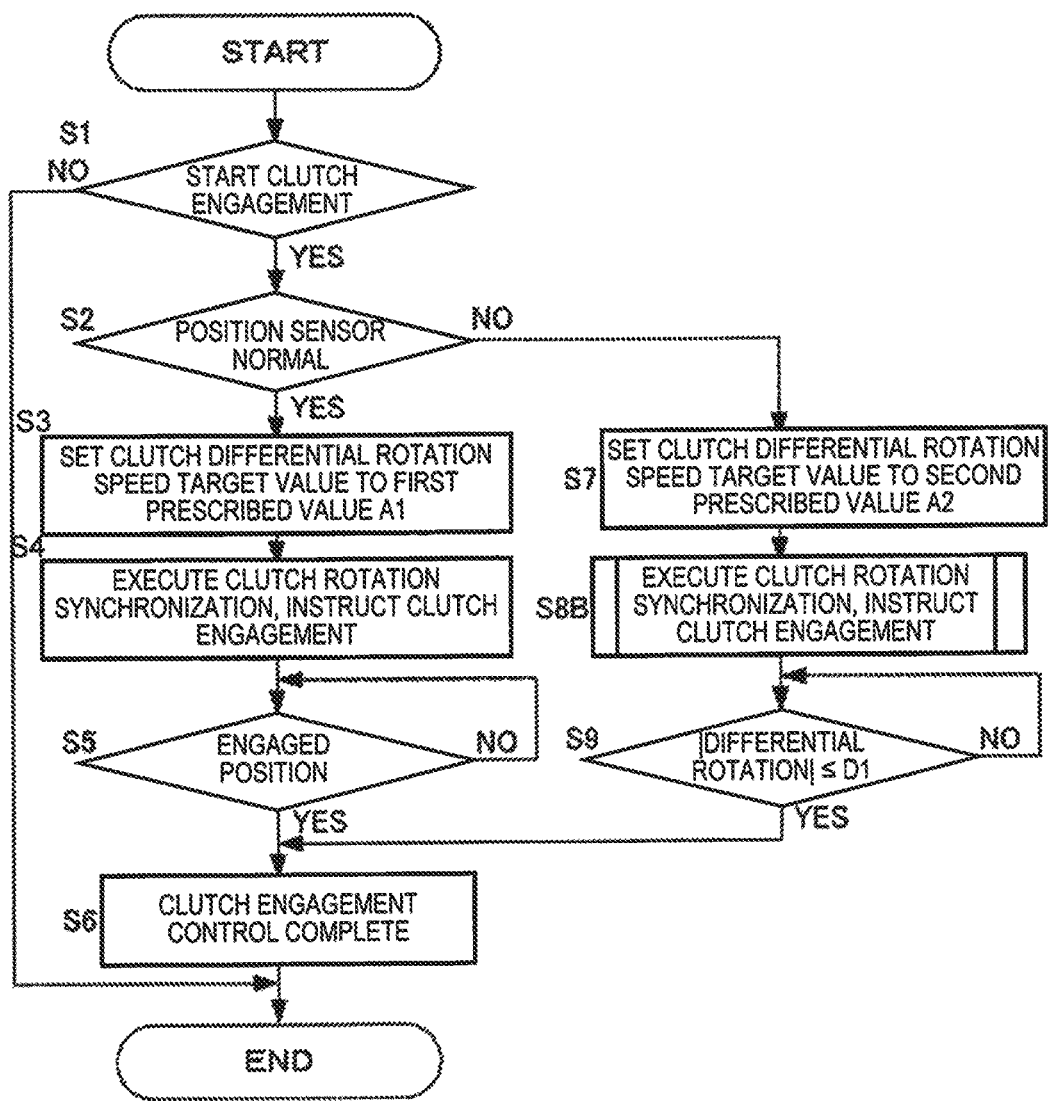

[FIG. 11]
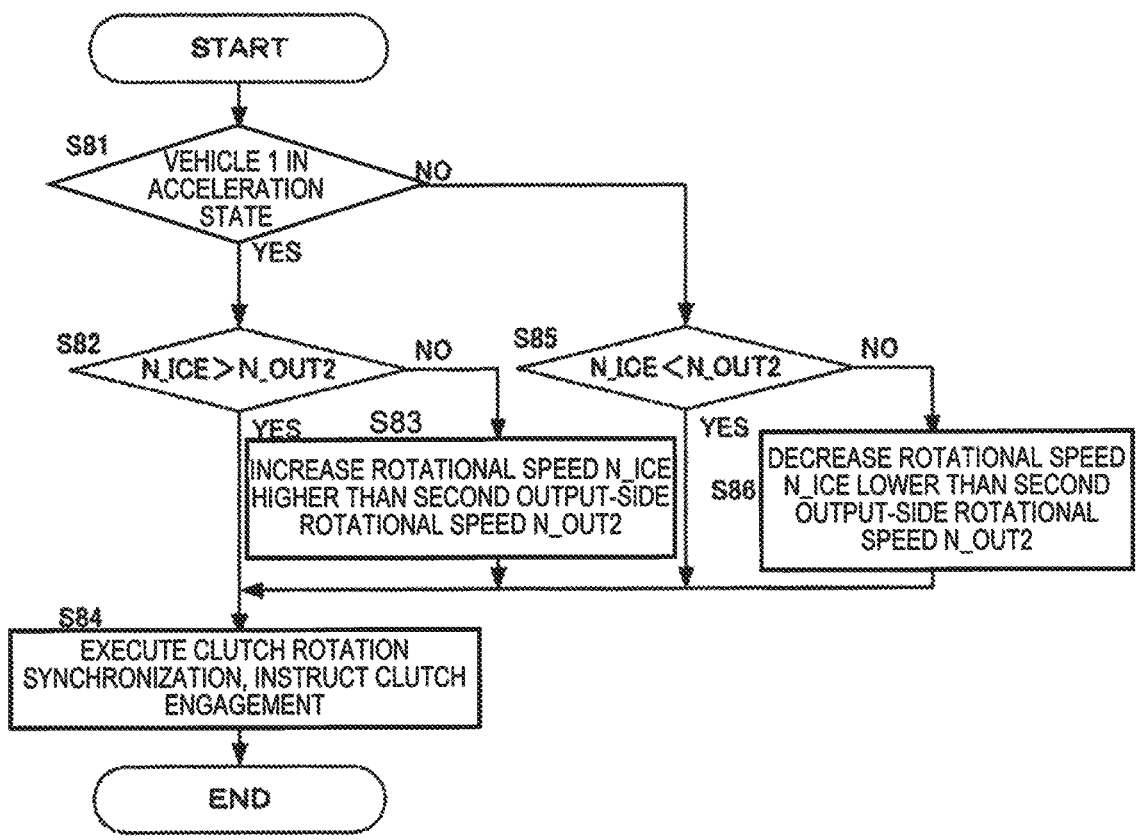
[FIG. 12]
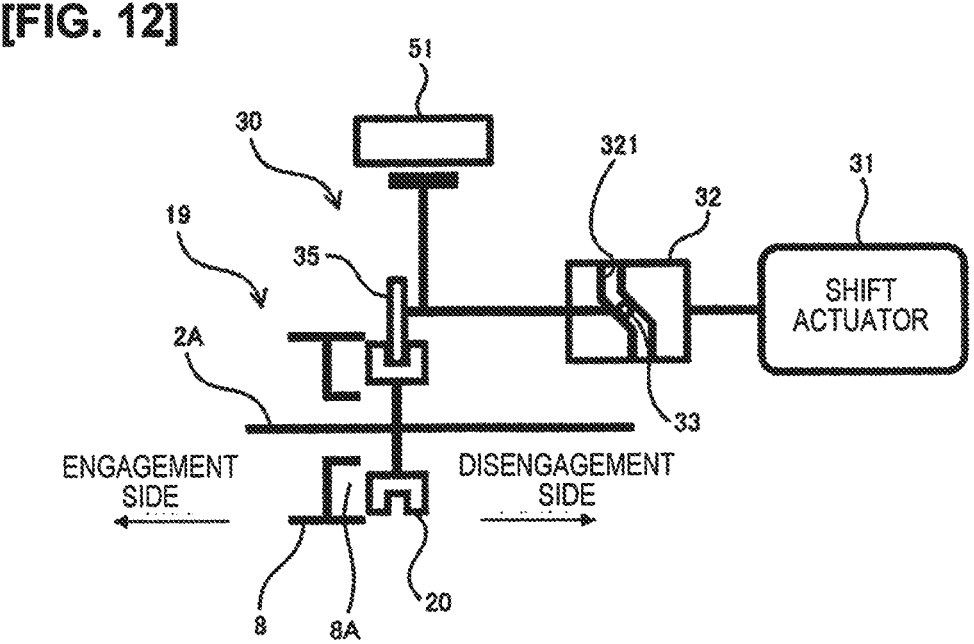

[FIG. 13]
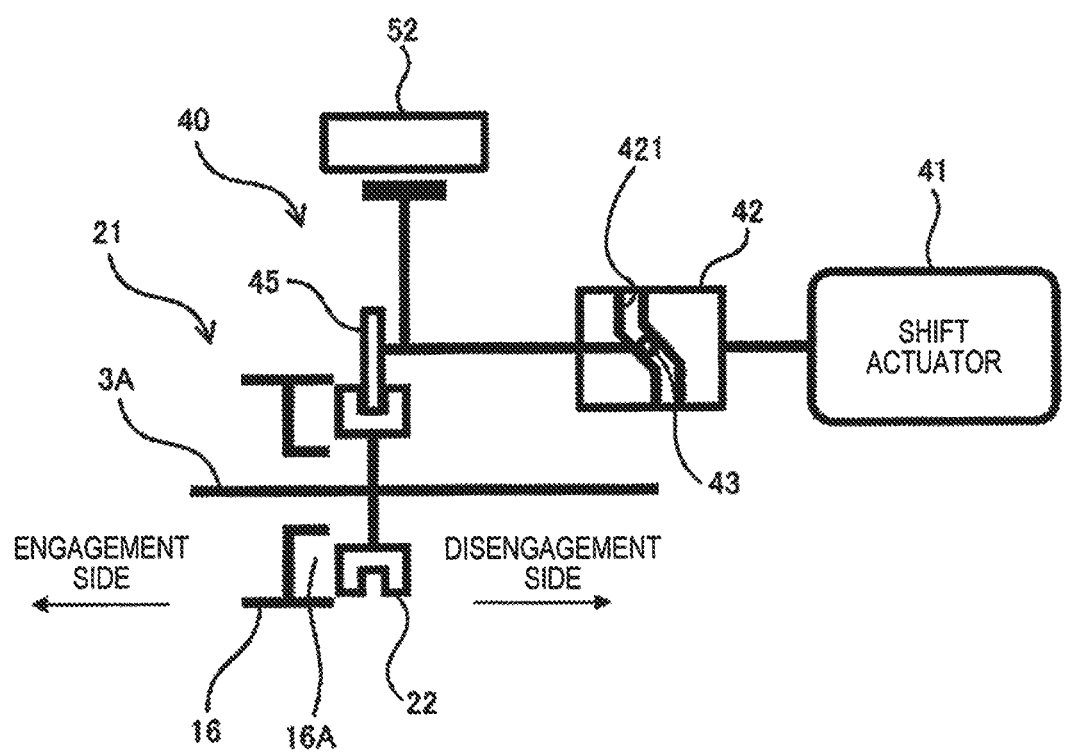

[FIG. 14]
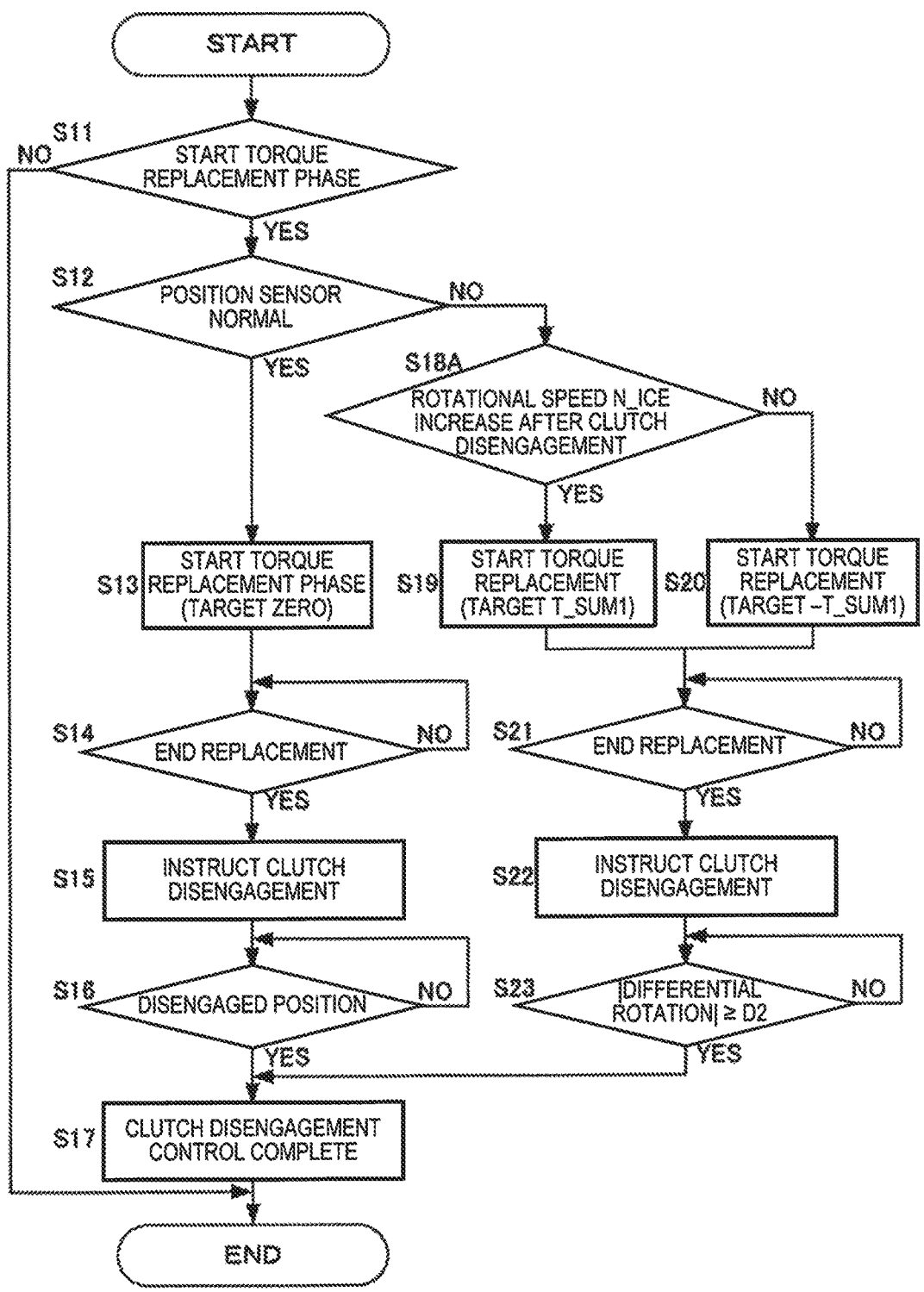

VEHICLE CLUTCH CONTROL METHOD AND VEHICLE CLUTCH CONTROL DEVICE

CROSS-REFERENCE TO RELATED APPLICATIONS

This application is a U.S. national stage application of International Application No. PCT/IB2020/000959, filed on Nov. 18, 2020.

BACKGROUND

Technical Field

The present disclosure relates to vehicle clutch control.

Background Information

JP2015-028359A discloses a technology for detecting the position of a dog clutch sleeve using a stroke sensor.

SUMMARY

If a sensor is used to recognize the position of a dog clutch sleeve, failure of the sensor would make determination of the position of the sleeve impossible. It would thus become impossible to determine whether the dog clutch is engaged or released, and therefore there is the risk that the engagement and release control of the dog clutch cannot be completed.

In view of this problem, an object of the present invention is to enable the determination of the engagement or release of the dog clutch, even in the event of sensor failure.

A vehicle clutch control method according to one aspect of the present disclosure is a clutch control method for a vehicle having a dog clutch and an engagement sensor that detects an engagement of the dog clutch, comprising executing an engagement of the dog clutch when the magnitude of the differential rotation of the dog clutch is less than or equal to a prescribed value, and offsetting the prescribed value to the larger side when the engagement sensor has failed and then determining the engagement of the dog clutch based on the differential rotation.

A vehicle clutch control method according to another aspect of the present disclosure is a clutch control method for a vehicle having a dog clutch, a shift mechanism that transmits clutch actuation force to the dog clutch without a spring, and a disengagement sensor that detects a disengagement of the dog clutch, comprising decreasing the transmission torque of the dog clutch in order to execute a disengagement of the dog clutch by means of the shift mechanism, determining a disengagement of the dog clutch based on the differential rotation of the dog clutch, when the disengagement sensor has failed, and decreasing the transmission torque, which is decreased when the dog clutch is disengaged, to a larger absolute value when the disengagement sensor has failed than when the disengagement sensor is normal.

A vehicle clutch control method according to yet another aspect of the present disclosure is a clutch control method for a vehicle having a dog clutch, a shift mechanism that transmits clutch actuation force to the dog clutch via a spring, and a disengagement sensor that detects a disengagement of the dog clutch, comprising decreasing the transmission torque of the dog clutch in order to execute disengagement of the dog clutch by means of the shift mechanism, determining a disengagement of the dog clutch based on the differential rotation of the dog clutch when the disengagement sensor has failed, and increasing the absolute value of the transmission torque when the differential rotation does not change by more than a prescribed absolute value, even after a prescribed period of time has elapsed after the disengagement sensor has failed.

According to yet other aspects of the present invention, vehicle clutch control devices respectively corresponding to the vehicle clutch control methods described above are provided.

BRIEF DESCRIPTION OF THE DRAWINGS

Referring now to the attached drawings which form a part of this original disclosure.

FIG. 1 is a schematic overview of a vehicle.
FIG. 2 is a diagram showing a power transmission state in a series hybrid mode.
FIG. 3 is a diagram showing a power transmission state in an internal combustion engine direct connection mode.
FIG. 4 is a diagram illustrating the operating regions of a vehicle.
FIG. 5 is a diagram showing a first shift mechanism.
FIG. 6 is a diagram showing a second shift mechanism.
FIG. 7 is a flowchart showing an example of engagement control.
FIG. 8A is a first diagram for explaining a target value of a clutch differential rotational speed.
FIG. 8B is a second diagram for explaining a target value of a clutch differential rotational speed.
FIG. 10 is a flowchart showing an example of control of a second embodiment.
FIG. 11 is a diagram showing a portion of the process shown in FIG. 10 in a subroutine.
FIG. 12 is a diagram showing a first shift mechanism of a third embodiment.
FIG. 13 is a diagram showing a second shift mechanism of the third embodiment.
FIG. 14 is a flowchart showing an example of control of the third embodiment.

DETAILED DESCRIPTION

Figure 9:
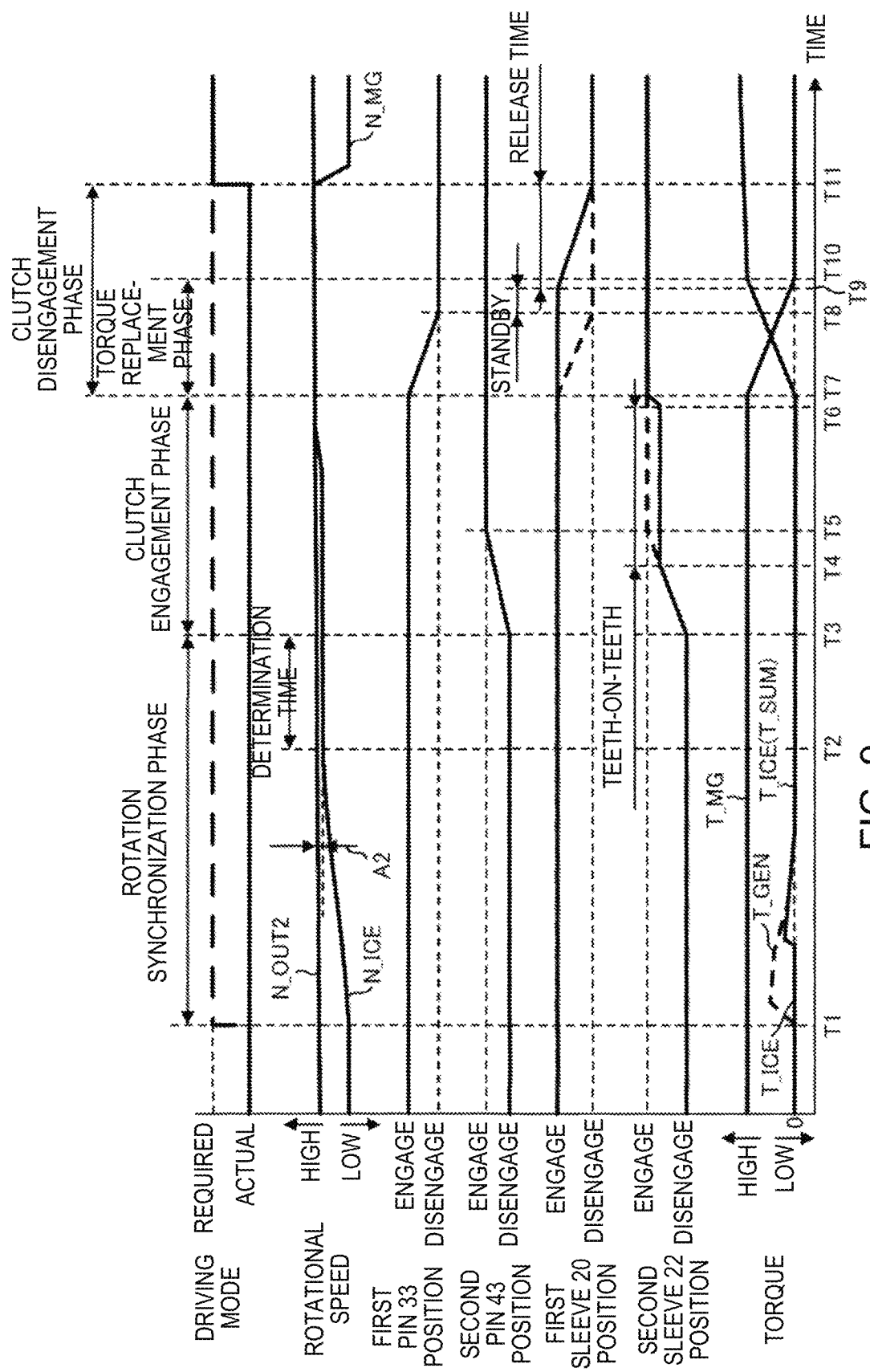
FIG. 9 is a diagram showing an example of a timing chart corresponding to FIG. 7.

Embodiments of the present invention will be described below with reference to the appended drawings.

First Embodiment

FIG. 1 is a schematic overview of a vehicle 1. The vehicle 1 is equipped with an internal combustion engine 3, a power generation motor 4, a battery 5, a travel motor 2, and a controller 7.

The internal combustion engine 3 may be either a gasoline engine or a diesel engine.

The power generation motor 4 generates electric power by being driven by the power of the internal combustion engine 3. The power generation motor 4 also has the function of motoring the internal combustion engine 3 by power running by means of the electric power from the battery 5, described further below.

The battery 5 is charged with the power generated by the power generation motor 4 and the power regenerated by the travel motor 2, described further below.

The travel motor 2 is driven by means of the power of the battery 5 to drive the drive wheels 6. Further, the travel motor 2 also has a so-called regeneration function, in which through its rotation with the rotation of the drive wheels 6 during deceleration, etc., the deceleration energy is regenerated as electric power.

The controller 7 controls the travel motor 2, the internal combustion engine 3, and the power generation motor 4.

The controller 7 consists of a microcomputer with a central processing unit (CPU), read-only memory (ROM), random-access memory (RAM), and an input/output interface (I/O interface). The controller 7 may also be configured by a plurality of microcomputers.

Further, the vehicle 1 has a power transmission path 24 for transmitting power between the travel motor 2 and the drive wheels 6, a power transmission path 25 for transmitting power between the internal combustion engine 3 and the drive wheels 6, and a power transmission path 26 for transmitting power between the internal combustion engine 3 and the power generation motor 4.

The power transmission path 24 is composed of a first reduction gear 8 provided on a rotary shaft 2A of the travel motor 2, a second reduction gear 9 that meshes with the first reduction gear 8, a differential gear 12 provided in a differential case 11, and a third reduction gear 10 that is provided coaxially with the second reduction gear 9 and that meshes with the differential gear 12. Further, the power transmission path 24 is provided with a first clutch mechanism 19 for switching between states in which the first reduction gear 8 can and cannot rotate relative to the rotary shaft 2A. The first clutch mechanism 19 is a so-called dog clutch, composed of a first sleeve 20 that is axially supported by the rotary shaft 2A to be slidable, and an engagement portion 8A provided on the first reduction gear 8. That is, when the first sleeve 20 moves in the direction of the first reduction gear 8 and a plurality of convex portions provided on the first sleeve 20 to protrude in the direction of the engagement portion 8A and a plurality of convex portions provided on the engagement portion 8A to protrude in the direction of the first sleeve 20 are arranged in a staggered manner in the direction of rotation and engage with each other, the engaged state is established. From this state, when the first sleeve 20 moves in the direction opposite to that of the first reduction gear 8 and the engagement of the convex portions of the two components is released, the disengaged state is established. The movement of the first sleeve 20 is performed by an electric actuator.

When the first clutch mechanism 19 is in the engaged state, the power of the travel motor 2 is transmitted to the drive wheels 6. When, on the other hand, the first clutch mechanism 19 is in a disengaged state, the rotation of the rotary shaft 2A of the travel motor 2 is not transmitted to the first reduction gear 8, so that the transmission of power from the travel motor 2 to the drive wheels 6 is cut off.

The power transmission path 25 is composed of a fourth reduction gear 16 provided on an output shaft 3A of the internal combustion engine 3, a fifth reduction gear 17 that meshes with the fourth reduction gear 16, the differential gear 12 provided in the differential case 11, and a sixth reduction gear 18 that is provided coaxially with the fifth reduction gear 17 and that meshes with the differential gear 12. Further, the power transmission path 25 is provided with a second clutch mechanism 21 that switches between states in which the fourth reduction gear 16 can and cannot rotate relative to the output shaft 3A. The second clutch mechanism 21 is a so-called dog clutch, consisting of a second sleeve 22 that is axially supported by the rotary shaft 3A so as to be slidable, and an engagement portion 16A provided on the fourth reduction gear 16. That is, when the second sleeve 22 moves in the direction of the fourth reduction gear 16 and a plurality of convex portions provided on the second sleeve 22 that protrude in the direction of the engagement portion 16A and a plurality of convex portions provided on the engagement portion 16A that protrude in the direction of the second sleeve 22 are arranged in a staggered manner in the direction of rotation and engage with each other, the engaged state is established. From this state, when the second sleeve 22 moves in the direction opposite to that of the fourth reduction gear 16 and the engagement of the convex portions of the two components is released, the disengaged state is established. Movement of the second sleeve 22 is performed by an electric actuator.

When the second clutch mechanism 21 is in the engaged state, the power of the internal combustion engine 3 is transmitted to the drive wheels 6. In the following description, this state is referred to as the internal combustion engine direct connection state. On the other hand, if the second clutch mechanism 21 is in a disengaged state, the rotation of the output shaft 3A of the internal combustion engine 3 is not transmitted to the fourth reduction gear 16, so that the power transmission from the internal combustion engine 3 to the drive wheels 6 is cut off.

The power transmission path 26 is composed of a seventh reduction gear 13 provided on the output shaft 3A of the internal combustion engine 3, an eighth reduction gear 14 that meshes with the seventh reduction gear 13, and a ninth reduction gear 15 provided on a rotary shaft 4A of the power generation motor 4. The power transmission path 26 is not equipped with a component for cutting off the transmission of power. That is, the power transmission path 26 is always in a state in which power is transmitted.

The first clutch mechanism 19 and the second clutch mechanism 21 are both dog clutches, and the engagement/disengagement operations of the first clutch mechanism 19 and the second clutch mechanism 21 are controlled by the controller 7. Various signals are input to the controller 7. The various signals include, for example, signals from rotational speed sensors that can detect the rotational speed of the first sleeve 20 and the first reduction gear 8 of the first clutch mechanism 19 and the second sleeve 22 and the fourth reduction gear 16 of the second clutch mechanism 21. These rotational speeds are used for detecting the differential rotation between the first clutch mechanism 19 and the second clutch mechanism 21.

In addition to the foregoing, the charge state SOC (State of Charge) of the battery, which indicates the amount of electric charge stored in the battery 5, is input to the controller 7 from the battery 5. Also input to the controller 7 are signals from an accelerator pedal position sensor that detects the accelerator pedal position, which indicates the amount of depression of the accelerator pedal of the vehicle 1, a vehicle speed sensor that detects vehicle speed VSP, a first clutch position sensor 51, a second clutch position sensor 52, etc.

In the present embodiment, rotational speed N_ICE of the internal combustion engine 3 constitutes the rotational speed of the first sleeve 20, and rotational speed N_MG of the travel motor 2 constitutes the rotational speed of the second sleeve 22. The rotational speeds of the first reduction gear 8 and the fourth reduction gear 16 constitute an output-side rotational speed N_OUT that rotates with the drive wheels 6. The output-side rotational speed N_OUT may be calculated, for example, by using a gear ratio based on a signal from a vehicle speed sensor.

The vehicle 1 which is configured as described above can switch between a series hybrid mode, in which travel is carried out by transmitting power to the drive wheels 6 by means of the power transmission path 24, and an internal combustion engine direct connection mode, in which travel is carried out by transmitting power to the drive wheels 6 by means of the power transmission path 25, in a state in which the internal combustion engine is directly connected. In the series hybrid mode, electric power of the power generation motor 4 generated by being driven by the power of the internal combustion engine 3 is used to drive the drive motor 6 with the travel motor 2. The controller 7 switches between the series hybrid mode and the internal combustion engine direct connection mode in accordance with the driving state, specifically, the vehicle speed VSP and the vehicle driving force DP.

FIG. 2 is a diagram showing a power transmission state in the series hybrid mode. In the series hybrid mode, power is transmitted to the drive wheels 6 via the power transmission path 24. That is, in the series hybrid mode, the power generated by the travel motor 2 is transmitted to the drive wheels 6 as a result of placing the first clutch mechanism 19 in the engaged state. At this time, the second clutch mechanism 21 is in the disengaged state.

Also, in the series hybrid mode, the power of the internal combustion engine 3 is transmitted to the power generation motor 4 via the power transmission path 26, the generation motor 4 generates power, and the generated electrical power charges the battery 5. However, whether or not power is generated by the power generation motor 4 is determined in accordance with the amount of charge on the battery 5, and when it is not necessary to charge the battery 5, the internal combustion engine 3 is stopped.

FIG. 3 is a diagram showing the power transmission state in the internal combustion engine direct connection mode. In the internal combustion engine direct connection mode, power is transmitted to the drive wheels 6 via the power transmission path 25. That is, in the internal combustion engine direct connection mode, the power generated by the internal combustion engine 3 is transmitted to the drive wheels 6 as a result of placing the second clutch mechanism 21 in the engaged state.

In the internal combustion engine direct connection mode, the first clutch mechanism 19 is in the disengaged state. If the first clutch mechanism 19 were placed in the engaged state in the internal combustion engine direct connection mode, the travel motor 2 would rotate together with the rotation of the drive wheels 6, thereby generating induced electromotive force. When the battery 5 has sufficient charge capacity, energy is regenerated by charging the battery 5 with the generated electrical power. However, when the battery 5 has insufficient charge capacity, the power generation resistance creates friction that impedes the rotation of the drive wheels 6, resulting in decreased fuel efficiency. In contrast, in the present embodiment, since the first clutch mechanism 19 is in the disengaged state in the internal combustion engine direct connection mode, the aforementioned decreased fuel efficiency performance due to the co-rotation of the travel motor 2 can be suppressed.

FIG. 4 is a diagram showing the operating regions of vehicle 1. Region R1 is a series hybrid mode region, which is set such that the upper limit value of the vehicle driving force DP is constant in the low-speed range and decreases as the vehicle speed VSP increases in the mid- to high-speed range. Region R2 is an internal combustion engine direct connection mode region, in which the vehicle speed VSP is higher than a prescribed vehicle speed VSP1 and the vehicle driving force DP is lower than a prescribed driving force DP1. The prescribed vehicle speed VSP1 is set in the mid- to high-speed range, and the prescribed driving force DP1 is set below the upper limit value of the vehicle driving force DP in region R1. The reason that the region R2 is set in this manner is as follows.

That is, in the series hybrid mode the power generation motor 4 can be driven to generate electric power while the internal combustion engine 3 is operated at a fuel-efficient operating point, thereby achieving high fuel efficiency. On the other hand, during high-speed travel, the required driving force becomes smaller, so that the operating point of the internal combustion engine 3 approaches a fuel-efficient operating point. In this case, when electrical conversion efficiency is taken into account, the system efficiency is reversed between the series hybrid mode and the internal combustion engine direct connection mode.

Hysteresis is provided at the boundary between regions R1 and R2. Therefore, after the driving mode is shifted from the series hybrid mode to the internal combustion engine direct connection mode in the acceleration state, the driving mode does not immediately switch to the series hybrid mode, even if the vehicle 1 immediately decelerates. Similarly, after the driving mode is shifted from the internal combustion engine direct connection mode to the series hybrid mode in the deceleration state, the driving mode does not immediately switch to the internal combustion engine direct connection mode, even if the vehicle 1 immediately accelerates.

Next, shift mechanisms provided in the vehicle 1 will be described.

FIG. 5 is a diagram showing a first shift mechanism 30, and FIG. 6 is a diagram showing a second shift mechanism 40. The vehicle 1 includes the first shift mechanism 30 and the second shift mechanism 40.

The first shift mechanism 30 is used to engage and disengage the first clutch mechanism 19 and includes a first shift actuator 31, a first shift cam 32, a first pin 33, a first spring 34, and a first shift fork 35. The first shift mechanism 30 transmits power from the first shift actuator 31 to the first clutch mechanism 19 as a clutch actuation force in the engaging and disengaging directions.

The second shift mechanism 40 is used to engage and disengage the second clutch mechanism 21 and includes a second shift actuator 41, a second shift cam 42, a second pin 43, a second spring 44, and a second shift fork 45. The second shift mechanism 40 transmits power from the second shift actuator 41 to the second clutch mechanism 21 as a clutch actuation force in the engaging and disengaging directions.

The first shift mechanism 30 and the second shift mechanism 40 have similar structures. For this reason, the first shift mechanism 30 will be used as an example in the description below.

The first shift actuator 31 drives the first shift cam 32. The first shift actuator 31 comprises, for example, a motor, which rotationally drives the first shift cam 32. The first shift cam 32 has a first guide groove 321. A first pin 33 engages with the first guide groove 321. The first guide groove 321 guides the first pin 33 when the first shift cam 32 rotates in order to move the first pin 33 in the axial direction of the first shift cam 32. The axial direction of the first shift cam 32 is the axial direction of the rotary shaft 2A on which the first sleeve 20 is provided, that is, the operating direction of the first clutch mechanism 19.

The first pin 33 is connected to the first shift fork 35 via the first spring 34. The first spring 34 is provided between the first shift cam 32 and the first shift fork 35 on the power transmission path that connects the first shift actuator 31 and the first shift fork 35. A spring with a stroke length that can move the first shift fork 35 from the disengaged position to the engaged position is used as the first spring 34.

The first shift fork 35 engages the first sleeve 20 of the first clutch mechanism 19. An outer peripheral groove in the first sleeve 20 engages with the first shift fork 35 so as to be slidable in the direction of rotation. By means of the clutch actuation force transmitted from the first shift fork 35, the first sleeve 20 moves in the direction of actuation of the first clutch mechanism 19, that is, the direction in which the first clutch mechanism 19 is engaged and the direction in which the first clutch mechanism 19 is disengaged.

The first shift mechanism 30 is provided with the first clutch position sensor 51, and the second shift mechanism 40 is provided with the second clutch position sensor 52. The first clutch position sensor 51 detects the axial position of the first sleeve 20, and the second clutch position sensor 52 detects the axial position of the second sleeve 22.

The detecting portion of the first clutch position sensor 51 is the power transmission position between the first spring 34 and the first shift fork 35, that is, the portion that integrally moves with the first sleeve 20 in the axial direction. Similarly, the detecting portion of the second clutch position sensor 52 is provided at the portion that moves integrally with the second sleeve 22 in the axial direction.

For example, a stroke sensor may be used as the first clutch position sensor 51. In this example, the first clutch position sensor 51 detects the axial position of the portion to be detected in order to detect the engagement position of the first sleeve 20. The same applies to the second clutch position sensor 52.

The first clutch position sensor 51 detects the engagement position of the first sleeve 20 in order to function as an engagement sensor, and detects the disengaged position of the first sleeve 20 in order to function as a disengagement sensor. The first clutch position sensor 51 serving as engagement and disengagement sensors may be a sensor other than a stroke sensor, or may be composed of a plurality of sensors. The same applies to the second clutch position sensor 52.

When engaging the second clutch mechanism 21, the controller 7 recognizes the position of the second sleeve 22 by means of the second clutch position sensor 52. In this case, if the second clutch position sensor 52 has failed, the position of the second sleeve 22 cannot be determined. An engagement of the second clutch mechanism 21 can thus not be determined, and therefore there is the risk that the engagement control of the second clutch mechanism 21 cannot be completed. The same applies to the first clutch mechanism 19.

In view of such circumstances, in the present embodiment, the controller performs the clutch engagement control described below.

FIG. 7 is a flowchart showing one example of the engagement control performed by the controller 7. Hereinbelow, the second clutch mechanism 21 is described as an example of a dog clutch, and supplementary explanations will be provided as needed for the case of the first clutch mechanism 19.

In Step S1, the controller 7 determines whether clutch engagement has begun. Here, the second clutch mechanism 21 is engaged when the driving mode shifts from the series hybrid mode to the internal combustion engine direct connection mode.

As a result, in Step S1, it is determined that engagement has begun when the driving operating point of the vehicle 1 moves from region R1 to region R2. In the case of the first clutch mechanism 19, it can be determined that engagement has begun when the driving operating point of the vehicle 1 moves from region R2 to region R1. In the case of a negative determination in Step S1, the process is temporarily ended, and in the case of a positive determination in Step S1, the process proceeds to Step S2.

In Step S2, the controller 7 determines whether the position sensor is normal. An abnormality of the second clutch position sensor 52 is a sensor abnormality that includes disconnection, etc., in which the engagement and disengaged positions of the second sleeve 22 cannot be appropriately detected. The presence or absence of an abnormality of the second clutch position sensor 52 may be determined by means of any known or otherwise appropriate technology. In the case of a positive determination in Step S2, the process proceeds to Step S3.

In Step S3, the controller 7 sets a target value of the clutch differential rotational speed to a first prescribed value A1 at the time of rotation synchronization. The first prescribed value A1 is the target value, set in advance, when the second clutch position sensor 52 is normal.

In Step S4, the controller 7 executes the clutch rotation synchronization. The rotation synchronization of the second clutch mechanism 21 is performed by controlling the power generation motor 4 so that the rotation of the second sleeve 22 approaches the rotation of the fourth reduction gear 16. The magnitude (absolute value) of the differential rotation of the second clutch mechanism 21 thereby gradually decreases. In the case of the first clutch mechanism 19, the rotation synchronization can be performed by controlling the travel motor 2 so that the rotation of the first sleeve 20 approaches the rotation of the first reduction gear 8.

In Step S4, the controller 7 further issues a clutch engagement instruction. In Step S4, when the magnitude of the differential rotation of the second clutch mechanism 21 is less than or equal to the first prescribed value A1 during a preset determination time, an instruction to engage the clutch of the second clutch mechanism 21 is issued, thereby starting engagement of the second clutch mechanism 21.

In Step S5, the controller 7 determines whether the clutch sleeve is in the engaged position. In Step S5, clutch engagement of the second clutch mechanism 21 is determined based on a normal output of the second clutch position sensor 52.

In the case of a negative determination in Step S5, it is determined that the second clutch mechanism 21 is not engaged, and the process returns to Step S5. In the case of a positive determination in Step S5, it is determined that the second clutch mechanism 21 is engaged, and the process proceeds to Step S6.

In Step S6, the controller 7 completes the clutch engagement control. In Step S6, for example, a flag indicating whether the clutch is engaged is turned on, thereby completing the engagement control of the second clutch mechanism 21. In the case that the driving mode changes between the series hybrid mode and the internal combustion engine direct connection mode, when the clutch engagement control is completed, torque replacement between the travel motor 2 and the internal combustion engine 3 is initiated. The process is temporarily ended after Step S6.

In the case of a negative determination in Step S2, the process proceeds to Step S7. In Step S7, the controller 7 sets a target value of the clutch differential rotational speed to a second prescribed value A2 at the time of rotation synchronization. The second prescribed value A2 is set as follows.

FIGS. 8A, 8B are diagrams for explaining the target value of the clutch differential rotational speed. FIG. 8A shows a case in which the position sensor is normal, and FIG. 8B shows a case in which the position sensor is abnormal. Hereinbelow, the second clutch position sensor 52 will be described as an example, but the same applies to the first clutch position sensor 51.

As shown in FIG. 8A, when the second clutch position sensor 52 is normal, the target value of the differential rotation at the time of rotation synchronization is set to the first prescribed value A1. On the other hand, the detected differential rotation, which is detected based on the output from the second clutch position sensor 52, has measurement variability $\alpha$ centered at the target differential rotation. The measurement variability a occurs mainly due to rotational variation. Thus, the measurement variability $\alpha$ is the measurement variability after the completion of clutch engagement, that is, after the engagement of the second clutch mechanism 21. Thus, the detected differential rotation has the lower limit value A1-$\alpha$ when the actual differential rotation is the first prescribed value A1.

The first prescribed value A1 is set such that the lower limit value A1-$\alpha$ does not become less than or equal to the differential rotation after engagement of the second clutch mechanism 21, i.e., zero. Therefore, clutch engagement is initiated before the differential rotation becomes zero. As a result, even if a teeth-on-teeth occurs, in which the dog teeth of the second clutch mechanism 21 interfere with each other after engagement is initiated, the phases of the dog teeth in the rotational direction shift so that the teeth-on-teeth is eliminated, and the clutch engagement proceeds again.

The first prescribed value A1 is set such that the lower limit value A1-$\alpha$ becomes smaller than the measurement variability $\alpha$. As a result, in this case, the ranges of the detected differential rotation overlap before and after clutch engagement. As a result, there may be situations in which the detected differential rotation does not change before and after clutch engagement.

When the second clutch position sensor 52 is normal, engagement of the second clutch mechanism 21 is determined using the second clutch position sensor 52. As a result, in this case, an engagement of the second clutch mechanism 21 can be determined even if the detected differential rotation does not change before and after a clutch engagement.

When the second clutch position sensor 52 is abnormal, it becomes impossible to use the second clutch position sensor 52 for the determination of engagement of the second clutch mechanism 21. In addition, if the target value of the differential rotation at the time of rotation synchronization is the first prescribed value A1, there may be situations in which the detected differential rotation does not change before and after clutch engagement. Therefore, in this case, when there is an attempt to determine clutch engagement based on differential rotation, there may be situations in which the clutch is erroneously determined to have been engaged, even though the clutch is not actually engaged.

As shown in FIG. 8B, in the present embodiment, when the second clutch position sensor 52 is abnormal, the target value of the differential rotation at the time of rotation synchronization is set to the second prescribed value A2, and then it is determined whether the second clutch mechanism 21 has been engaged based on the differential rotation.

The second prescribed value A2 is set such that a lower limit value A2-$\alpha$ of the detected differential rotation when the actual differential rotation is the second prescribed value A2 becomes larger than the measurement variability $\alpha$. The second prescribed value A2 corresponds to a value obtained by offsetting the first prescribed value A1 to the larger side, and is set to the value obtained by offsetting the first prescribed value A1 to a value greater than a variation range 2$\alpha$ of the differential rotation.

In this case, the ranges of the detected differential rotation will not overlap before and after clutch engagement. Therefore, since the detected differential rotation is different before and after clutch engagement, it is possible to determine whether the second clutch mechanism 21 has been engaged based on the differential rotation.

The second prescribed value A2 is set in advance based on experiments, etc., within a range of differential rotation that allows the second clutch mechanism 21 to be engaged. This is because there are cases in which the second clutch mechanism 21 cannot be engaged if the differential rotation is too large. The specific numerical values of the first prescribed value A1 and the second prescribed value A2 may differ between the first clutch mechanism 19 and the second clutch mechanism 21.

Returning to FIG. 7: in step S8A, the controller 7 performs clutch rotation synchronization of the second clutch mechanism 21. Rotational synchronization of the second clutch mechanism 21 is performed by controlling the power generation motor 4 in order to bring the rotation of the second sleeve 22 close to the rotation of the fourth reduction gear 16. In Step S8A, the controller 7 further issues an instruction for clutch engagement of the second clutch mechanism 21 when the differential rotation of the second clutch mechanism 21 is less than or equal to the second prescribed value A2 during a preset determination time. This will initiate the engagement of the second clutch mechanism 21.

In Step S9, the controller 7 determines whether the magnitude of the differential rotation is less than or equal to a prescribed value D1. In other words, since the differential rotation after a clutch engagement is zero, in Step S9, it is determined whether the magnitude of the difference between the current differential rotation and the differential rotation after a clutch engagement is less than or equal to the prescribed value D1. The prescribed value D1 is a judgment value for determining whether or not the clutch has been engaged and is set in advance.

In the case of a negative determination in Step S9, it is determined that the second clutch mechanism 21 is not engaged, and the process returns to Step S9. In the case of a positive determination in Step S9, it is determined that the second clutch mechanism 21 is engaged. In this case, the process proceeds to Step S6, and the controller 7 completes the clutch engagement control of the second clutch mechanism 21.

FIG. 9 is a diagram showing one example of a timing chart corresponding to the flowchart shown in FIG. 7. FIG. 9 describes a case in which a driving mode transition control is performed for a transition from the series hybrid mode to the internal combustion engine direct connection mode.

The driving mode transition control has a rotation synchronization phase, a clutch engagement phase, a torque replacement phase, and a clutch disengagement phase. In the rotation synchronization phase, the rotational synchronization of the dog clutch is performed, and in the clutch engagement phase, the clutch engagement control of the dog clutch is performed. In the torque replacement phase, the torque replacement is performed in which the drive torque of the vehicle 1 is replaced between torque T_MG of the travel motor 2 and torque T_SUM of the internal combustion engine 3 and the power generation motor 4. In the clutch disengagement phase, clutch disengagement control of the dog clutch is performed.

At timing T1, the driving operating point of the vehicle 1 moves from region R1 to region R2. For this reason, a request to shift the driving mode from the internal combustion engine direct connection mode to the series hybrid mode is generated, as indicated by the broken line. Moreover, the rotational synchronization of the second clutch mechanism 21 is initiated in accordance with the driving mode transition request.

For this reason, it is possible to bring the rotational speed N_ICE of the internal combustion engine 3 close to a second output-side rotational speed N_OUT2 by means of an increase in the torque T_GEN of the power generation motor 4. The second output-side rotational speed N_OUT2 is the rotational speed of the fourth reduction gear 16. Therefore, from timing T1, the rotation of the second sleeve 22 is brought closer to the rotation of the fourth reduction gear 16.

The torque transmitted by the second clutch mechanism 21 is the sum of the torque T_ICE of the internal combustion engine 3 and the torque T_GEN of the power generation motor 4, i.e., torque T_SUM, and when the torque T_GEN subsequently becomes zero, the torque T_ICE will represent the torque T_SUM. At this time, control may be performed to finely adjust the torque T_GEN so that the rotational speed N_ICE is kept at a constant rotational speed.

At timing T2, the magnitude of the differential rotation of the second clutch mechanism 21, that is, the differential rotation between the second output-side rotational speed N_OUT2 and the rotational speed N_ICE, becomes less than or equal to the second prescribed value A2. The magnitude of the differential rotation remains less than or equal to the second prescribed value A2 until timing T3 when the determination time has elapsed. For this reason, at timing T3, clutch engagement is initiated, and the second pin 43 and the second sleeve 22 begin to move to the engagement side.

At timing T4, a teeth-on-teeth occurs in the second clutch mechanism 21, and the movement of the second sleeve 22 is hindered. Therefore, even if the second pin 43 moves from timing T4, the second sleeve 22 does not move, and the second spring 44 is compressed.

The second pin 43 moves to the engaged position at timing T5, but the teeth-on-teeth is not released at timing T5 but is subsequently released at timing T6. When the teeth-on-teeth is released, the second sleeve 22 starts to move to the engagement side by means of the spring force of the second spring 44 and reaches the engaged position at timing T7. As a result, the differential rotation of the second clutch mechanism 21 becomes less than or equal to the prescribed value D1, and clutch engagement is completed.

Thus, in the present embodiment the second clutch mechanism 21 is engaged when the differential rotation of the second clutch mechanism 21 is less than or equal to the second prescribed value A2. The range of the detected differential rotation at this time does not overlap the range of the detected differential rotation after clutch engagement, as described using FIG. 8B. Therefore, in the present embodiment it is not erroneously determined that the second clutch mechanism 21 has been engaged until the magnitude of the differential rotation of the second clutch mechanism 21 becomes less than or equal to the prescribed value D1 at timing T7.

A description of timing T7 and later is as follows.

From timing T7, disengagement of the first clutch mechanism 19 is started in accordance with the completion of the clutch engagement control of the second clutch mechanism 21, and the first pin 33 starts to move to the disengagement side. At this time, the torque T_MG of the travel motor 2 is still acting on the first clutch mechanism 19. The torque T_MG causes the first clutch mechanism 19 to generate a disengagement resistance force which prevents the movement of the first sleeve 20 to the disengagement side.

For this reason, even if the first pin 33 moves from the engaged position to the disengaged position between timings T7 and T8, the first sleeve 20 does not move, as indicated by the broken line, at which time the first spring 34 expands.

From timing T7, torque replacement is performed in which the drive torque of the vehicle 1 is changed from the torque T_MG of the travel motor 2 to the torque T_SUM. In the torque replacement, a decrease in the transmission torque of the first clutch mechanism 19 and an increase in the transmission torque of the second clutch mechanism 21 are performed simultaneously.

The torque T_MG constitutes the transmission torque of the first clutch mechanism 19, and the torque T_SUM constitutes the transmission torque of the second clutch mechanism 21, as described above. For this reason, from timing T7, the torque T_SUM starts to increase while the torque T_MG starts to decrease. At this time, the increase in the torque T_SUM is basically performed by means of an increase in the torque T_ICE, and the power generation motor 4 is responsible for the fine adjustment of the torque T_SUM. At this time, the increase in the torque T_SUM may be performed only by means of the torque T_GEN.

At timing T9, the spring force of the first spring 34 exceeds the disengagement resistance force as the torque T_MG decreases. For this reason, from timing T9, the first sleeve 20 starts to move to the disengagement side by means of the spring force of the first spring 34. Between timings T8 and T9 is the standby time of the first sleeve 20 from when the first pin 33 moves to the disengaged position to when the first sleeve 20 starts to move.

The torque replacement is completed at timing T10, and the clutch disengagement control of the first clutch mechanism 19 is completed when, at timing T11, the first sleeve 20 moves to the disengaged position. As a result, the transition of the driving mode is completed. From timing T11, power is not transmitted from the internal combustion engine 3 to the first sleeve 20 via the first reduction gear 8. For this reason, the rotational speed N_MG of the travel motor 2, which rotates together with the first sleeve 20, starts to decrease. The time between timing T9 and timing T11 is the release time of the first sleeve 20 during which the first sleeve 20 moves from the engaged position to the disengaged position.

Next, the main action and effects of the present embodiment will be described.

The clutch control method for the vehicle 1 according to the present embodiment is used in the vehicle 1 having the second clutch mechanism 21, which is one example of a dog clutch, and the second clutch position sensor 52, which detects engagement of the second clutch mechanism 21. The clutch control method for the vehicle 1 comprises executing an engagement of the second clutch mechanism 21 when the magnitude of the differential rotation of the second clutch mechanism 21 is less than or equal to the first prescribed value A1, and setting the target value of the differential rotation at the time of rotation synchronization to the second prescribed value A2, that is, offsetting the first prescribed value A1 to the larger side, at the time of failure of the second clutch position sensor 52, and then determining engagement of the second clutch mechanism 21 based on the differential rotation.

By means of such a method, it is possible to determine an engagement of the second clutch mechanism 21 even if the second clutch position sensor 52 has failed, so that it is possible to shift to the desired driving mode. As a result, it is possible to prevent a deterioration in fuel efficiency and power performance of the vehicle 1.

In the present embodiment, the first prescribed value A1 is offset to a value greater than the variation range 2α of the differential rotation after engagement of the second clutch mechanism 21. In other words, the second prescribed value A2 is set to a value greater than the variation range 2α of the differential rotation after engagement of the second clutch mechanism 21.

By such a method, because the differential rotation can be made different before and after clutch engagement, it is possible to accurately determine an engagement of the second clutch mechanism 21.

In the case that a failure of the first clutch position sensor 51 is determined while traveling in the internal combustion engine direct connection mode, the driving mode can be shifted to the series hybrid mode in order to prevent the internal combustion engine 3 from stalling and the vehicle 1 from becoming undrivable. For this purpose, it is necessary to complete the clutch engagement control of the first clutch mechanism 19 when the first clutch position sensor 51 fails.

The clutch control method for the vehicle 1 can also be used when the first clutch mechanism 19 is engaged, which is an example of a dog clutch. For this reason, even if failure of the first clutch position sensor 51 is determined during travel in the internal combustion engine direct connection mode, it is possible to complete the clutch engagement control of the first clutch mechanism 19 for the purpose of shifting the driving mode to the series hybrid mode. As a result, it is possible to prevent the internal combustion engine 3 from stalling and the vehicle 1 from becoming undrivable.

Second Embodiment

In the present embodiment, the controller 7 is configured to further carry out the control described below. Hereinbelow, the second clutch mechanism 21 is described as an example of a dog clutch, but the same applies to the first clutch mechanism 19.

FIG. 10 is a flowchart showing one example of the control performed by the controller 7 in the present embodiment. FIG. 11 shows the subroutine of Step S8B shown in FIG. 10. The flowchart of FIG. 10 is the same as the flowchart shown in FIG. 7 except that Step S8B is provided instead of Step SBA. In the present embodiment, the implementation of clutch engagement and the execution of clutch rotation synchronization in Step S8B are performed by the subroutine shown in FIG. 11.

As shown in FIG. 11, the controller 7 determines whether the vehicle 1 is accelerating in Step S81. Whether the vehicle 1 is accelerating can be determined based on the output of a vehicle speed sensor, for example. In the case of a positive determination in Step S81, the process proceeds to Step S82.

In Step S82, the controller 7 determines whether the rotational speed N_ICE of the internal combustion engine 3 is higher than the second output-side rotational speed N_OUT2.

Here, in the power transmission path 25 via the second clutch mechanism 21, the second sleeve 22 is located in the power transmission path on the internal combustion engine 3 side, that is, on the upstream side of the fourth reduction gear 16. Therefore, the second sleeve 22 corresponds to an upstream-side engagement element in the power transmission path 25, and the fourth reduction gear 16 corresponds to a downstream-side engagement element in the power transmission path 25.

If the rotational speed of the upstream-side engagement element is higher than the rotational speed of the downstream-side engagement element in the power transmission path 25, the direction in which the rotational speed of the downstream-side engagement element can vary at the time of engagement of the second clutch mechanism 21 is the direction of acceleration, which matches the acceleration state of the vehicle 1.

For this reason, in the case of a positive determination in Step S82, the process proceeds to Step S84, and the controller 7 issues clutch engagement and clutch rotation synchronization instructions for the second clutch mechanism 21.

In this case, in the clutch rotation synchronization, the rotational speed N_ICE can be controlled in the downward direction, in order to bring the rotational speed N_ICE close to the second output-side rotational speed N_OUT2. The clutch engagement instruction is issued when the magnitude of the differential rotation of the second clutch mechanism 21 is less than or equal to the second prescribed value A2 during the determination time. The process is temporarily ended after Step S84.

If the rotational speed of the upstream-side engagement element is lower than the rotational speed of the downstream-side engagement element, the direction in which the rotational speed of the downstream-side engagement element can vary at the time of engagement of the second clutch mechanism 21 is the direction of deceleration, which does not match the acceleration state of the vehicle 1. As a result, the behavior of the vehicle 1 changes at the time of engagement of the second clutch mechanism 21, thereby imparting discomfort to the driver.

For this reason, in the case of a negative determination in Step S82, the process proceeds to Step S83, and the controller 7 controls the power generation motor 4 in order to increase the rotational speed N_ICE to be higher than the second output-side rotational speed N_OUT2. As a result, the driver is less likely to feel the change in behavior of the vehicle 1 when the second clutch mechanism 21 is engaged.

In Step S83, the rotational speed N_ICE can be made higher than the second output-side rotational speed N_OUT2 by a prescribed amount set in advance. After Step S83, the process proceeds to Step S84, and clutch rotation synchronization and clutch engagement instructions for the second clutch mechanism 21 are carried out, in the same manner as in the case of a positive determination in Step S82.

In the case of a negative determination in Step S81, it is determined that the vehicle is in a deceleration state, and the process proceeds to Step S85. In Step S85, the controller 7 determines whether the rotational speed N_ICE is lower than the second output-side rotational speed N_OUT2.

If the rotational speed of the upstream-side engagement element is lower than the rotational speed of the downstream-side engagement element in the power transmission path 25, the direction in which the rotational speed of the downstream-side engagement element can vary at the time of engagement of the second clutch mechanism 21 is the direction of deceleration, which matches the deceleration state of the vehicle 1.

For this reason, in the case of a negative determination in Step S85, the process proceeds to Step S84, and clutch rotation synchronization and clutch engagement instructions for the second clutch mechanism 21 are performed.

In this case, in the clutch rotation synchronization, the rotational speed N_ICE can be controlled in the upward direction in order to bring the rotational speed N_ICE close to the second output-side rotational speed N_OUT2. The clutch engagement instruction is issued when the magnitude of the differential rotation of the second clutch mechanism 21 is less than or equal to the second prescribed value A2 during the determination time.

If the rotational speed of the upstream-side engagement element is lower than the rotational speed of the downstream-side engagement element, the direction in which the rotational speed of the downstream-side engagement element can vary at the time of engagement of the second clutch mechanism 21 is the direction of acceleration, which does not match the deceleration state of the vehicle 1. As a result, the behavior of the vehicle 1 changes at the time of engagement of the second clutch mechanism 21, thereby imparting discomfort to the driver.

For this reason, in the case of a negative determination in Step S85, the process proceeds to Step S86, and the controller 7 controls the internal combustion engine 3 in order to decrease the rotational speed N_ICE to be lower than the second output-side rotational speed N_OUT2. As a result, the driver is less likely to feel the change in behavior of the vehicle 1 when the second clutch mechanism 21 is engaged.

In Step S86, the rotational speed N_ICE can be made lower than the second output-side rotational speed N_OUT2 by a prescribed amount set in advance. After Step S86, the process proceeds to Step S84. In this case, clutch rotation synchronization and clutch engagement instructions for the second clutch mechanism 21 is performed, in the same manner as the case of a positive determination in Step S85.

Next, the main action and effects of the present embodiment will be described.

In the present embodiment, during acceleration of the vehicle 1, the engagement of the second clutch mechanism 21 is executed when the rotational speed N_ICE, which corresponds to the rotational speed of the second sleeve 22, is greater than the second output-side rotational speed N_OUT2, which is the rotational speed of the fourth reduction gear 16, in the power transmission path 25 via the second clutch mechanism 21. During deceleration of the vehicle 1, engagement of the second clutch mechanism 21 is executed when the rotational speed N_ICE is smaller than the second output-side rotational speed N_OUT2 in the power transmission path 25 via the second clutch mechanism 21.

By means of such a method, it is possible to avoid situations in which the acceleration of the vehicle 1 becomes a negative value when the second clutch mechanism 21 is engaged during acceleration and situations in which the acceleration of the vehicle 1 becomes a positive value when the second clutch mechanism 21 is engaged during deceleration. Therefore, it is possible to make it less likely that the driver feels behavior change of the vehicle 1 when the second clutch mechanism 21 is engaged during acceleration or deceleration of the vehicle 1.

Third Embodiment

This embodiment is the same as the first embodiment except that the first shift mechanism 30, the second shift mechanism 40, and the controller 7 are configured as described below. Similar changes can also be applied to the second embodiment.

FIG. 12 is a diagram showing the first shift mechanism 30 of the third embodiment. FIG. 13 is a diagram showing the second shift mechanism 40 of the third embodiment. In the present embodiment, the first shift mechanism 30 does not have a first spring 34, and the second shift mechanism 40 does not have a second spring 44. Therefore, the first shift mechanism 30 is configured to transmit clutch actuation force to the first clutch mechanism 19 without a spring (including the first spring 34), and the second shift mechanism 40 is configured to transmit clutch actuation force to the second clutch mechanism 21 without a spring (including the second spring 44).

In the present embodiment, the controller 7 is configured to carry out the control described below when the dog clutch is disengaged. Hereinbelow, the second clutch mechanism 21 is described as an example of a dog clutch, but the same applies to the first clutch mechanism 19.

FIG. 14 is a flowchart showing an example of control performed by the controller 7 in the present embodiment. In Step S11, the controller 7 determines whether the torque replacement phase has begun. The torque replacement phase is initiated when the clutch engagement phase has been completed. Therefore, for example, in Step S11, a determination can be made based on a flag that indicates whether the second clutch mechanism 21 has been engaged. In the case of a positive determination in Step S11, the process proceeds to Step S12.

In Step S12, the controller 7 determines whether the second clutch position sensor 52 is normal. In the case of a positive determination in Step S12, the process proceeds to Step S13.

In Step S13, the controller 7 starts the torque replacement. Here, in the second clutch mechanism 21, the transmission torque can be reduced in order to decrease the disengagement resistance force, which prevents movement of the second sleeve 22 to the disengagement side, so that the second clutch mechanism 21 can be disengaged. Therefore, when the second clutch position sensor 52 is normal, in the torque replacement, the transmission torque of the second clutch mechanism 21, i.e., the torque T_SUM, is reduced with zero as the target value.

In Step S14, the controller 7 determines whether the torque replacement has ended. Whether the torque replacement has ended can be determined from whether the torque T_SUM has reached the target value. In the case of a negative determination in Step S14, the process returns to Step S14. In the case of a positive determination in Step S14, the process proceeds to Step S15.

In Step S15, the controller 7 issues clutch disengagement instructions for the second clutch mechanism 21. As a result, the transmission torque of the second clutch mechanism 21 is reduced, and the second shift actuator 41 is then driven in the disengagement direction of the second clutch mechanism 21. As a result, the clutch operating force in the disengagement direction is transmitted to the second sleeve 22 by the second shift mechanism 40.

In Step S16, the controller 7 determines whether the second sleeve 22 is in the disengaged position. In Step S16, clutch disengagement of the second clutch mechanism 21 is determined based on a normal second clutch position sensor 52 output. In the case of a negative determination in Step S16, the process returns to Step S16, and in the case of a positive determination in Step S16, the process proceeds to Step S17.

In Step S17, the controller 7 completes the clutch disengagement control of the second clutch mechanism 21. In Step S17, for example, a flag that indicates whether the clutch has been disengaged can be turned on. The process is temporarily ended after Step S17.

In the case of a negative determination in Step S12, the process proceeds to Step S18A, and the controller 7 determines whether the rotational speed N_ICE increases after clutch disengagement of the second clutch mechanism 21. After the second clutch mechanism 21 is disengaged, the driving mode becomes the series hybrid mode, and the internal combustion engine 3 is operated to generate power. In other words, in Step S18A, it is determined whether the rotational speed N_ICE increases by means of power generation operation after the second clutch mechanism 21 is disengaged.

In the power generation operation of the internal combustion engine 3, the required power generation, which is the electric power that should be generated in accordance with the required value, etc., of the vehicle driving force DP based on the state of charge SOC of the battery, the vehicle speed VSP, and the accelerator pedal position. In addition, the target value of the rotational speed N_ICE is set in accordance with the required power generation. Therefore, in Step S18A, a determination can be made based on the required power generation or the target value of the rotational speed N_ICE. The internal combustion engine 3 constitutes a generator together with the power generation motor 4. The rotational speed N_ICE corresponds to the rotational speed of the generator. In the case of a positive determination in Step S18A, the process proceeds to Step S19, and in the case of a negative determination in Step S18A, the process proceeds to Step S20.

In Step S19, the controller 7 sets the target value of the transmission torque of the second clutch mechanism 21 to be reduced to a prescribed value T_SUM1 and starts the torque replacement. The prescribed value T_SUM1 is a preset value greater than zero.

As a result, in the case that the rotational speed N_ICE becomes high after the second clutch mechanism 21 is disengaged, the target value of the transmission torque of the second clutch mechanism 21 is set to the positive side. Therefore, if the rotational speed N_ICE is higher after disengagement of the second clutch mechanism 21 than at the time of the start of disengagement, the transmission torque of the second clutch mechanism 21 to be reduced is reduced to the positive side.

In Step S20, the controller 7 sets the target value of the transmission torque of the second clutch mechanism 21 to be reduced to a negative value of the prescribed value T_SUM1, and starts the torque replacement.

As a result, in the case that the rotational speed N_ICE becomes low after the second clutch mechanism 21 is disengaged, the target value of the transmission torque of the second clutch mechanism 21 to be reduced is set to the negative side. Therefore, if the rotational speed N_ICE is lower after disengagement of the second clutch mechanism 21 than at the time of the start of disengagement, the transmission torque of the second clutch mechanism 21 to be reduced is reduced to the negative side.

As described above, when the second clutch position sensor 52 is normal, the target value of the transmission torque of the second clutch mechanism 21 is set to zero. Therefore, the transmission torque of the second clutch mechanism 21, which is reduced in Steps S19 and S20, is reduced to a large absolute value than when the second clutch position sensor 52 is normal. In other words, the target value to which the transmission torque of the second clutch mechanism 21 is reduced is set to a larger absolute value than in the normal state. The target value of the transmission torque of the second clutch mechanism 21 to be reduced can be made a larger absolute value than when the second clutch position sensor 52 is normal, within a range in which the disengagement resistance force of the second clutch mechanism 21 is lower than the clutch actuation force in the disengagement direction.

After Steps S19 and S20, the process proceeds to Step S21. In Step S21, it is determined whether the torque replacement has ended; in the case of a negative determination, the process returns to Step S21, and in the case of a positive determination, the process proceeds to Step S22. In Step S22, the clutch disengagement instruction is issued for the second clutch mechanism 21, in the same manner as in Step S15.

In Step S23, the controller 7 determines whether the magnitude of the differential rotation of the second clutch mechanism 21 is greater than or equal to a prescribed value D2. In Step S23, the disengagement determination of the second clutch mechanism 21 is made based on the differential rotation of the second clutch mechanism 21. In other words, since the differential rotation before clutch disengagement is zero, in Step S23, it is determined whether the magnitude of the difference between the current differential rotation and the differential rotation before clutch disengagement is greater than or equal to the prescribed value D2.

The prescribed value D2 is a judgment value for determining whether the clutch has been disengaged and is set to a value greater than the variation range 2α of the differential rotation. In this case, the ranges of the detected differential rotation will not overlap before and after clutch disengagement. Therefore, since the detected differential rotation is different before and after clutch disengagement, it is possible to determine whether the second clutch mechanism 21 has been disengaged based on the differential rotation.

In the case of a negative determination in Step S23, the process returns to Step S23. In the case of a positive determination in Step S23, it is determined that the second clutch mechanism 21 has been disengaged. In this case, the process proceeds to Step S17, and the clutch disengagement control of the second clutch mechanism 21 is completed.

The reason that the disengagement control of the second clutch mechanism 21 is completed in this manner even when the second clutch position sensor 52 fails is as follows.

That is, in the case that a failure of the second clutch position sensor 52 is determined during travel in the internal combustion engine direct connection mode, the driving mode can be shifted to the series hybrid mode in order to prevent the internal combustion engine 3 from stalling and the vehicle 1 from becoming undrivable. For this purpose, it is necessary to complete the clutch disengagement control of the second clutch mechanism 21 when the second clutch position sensor 52 fails.

Figure 15:
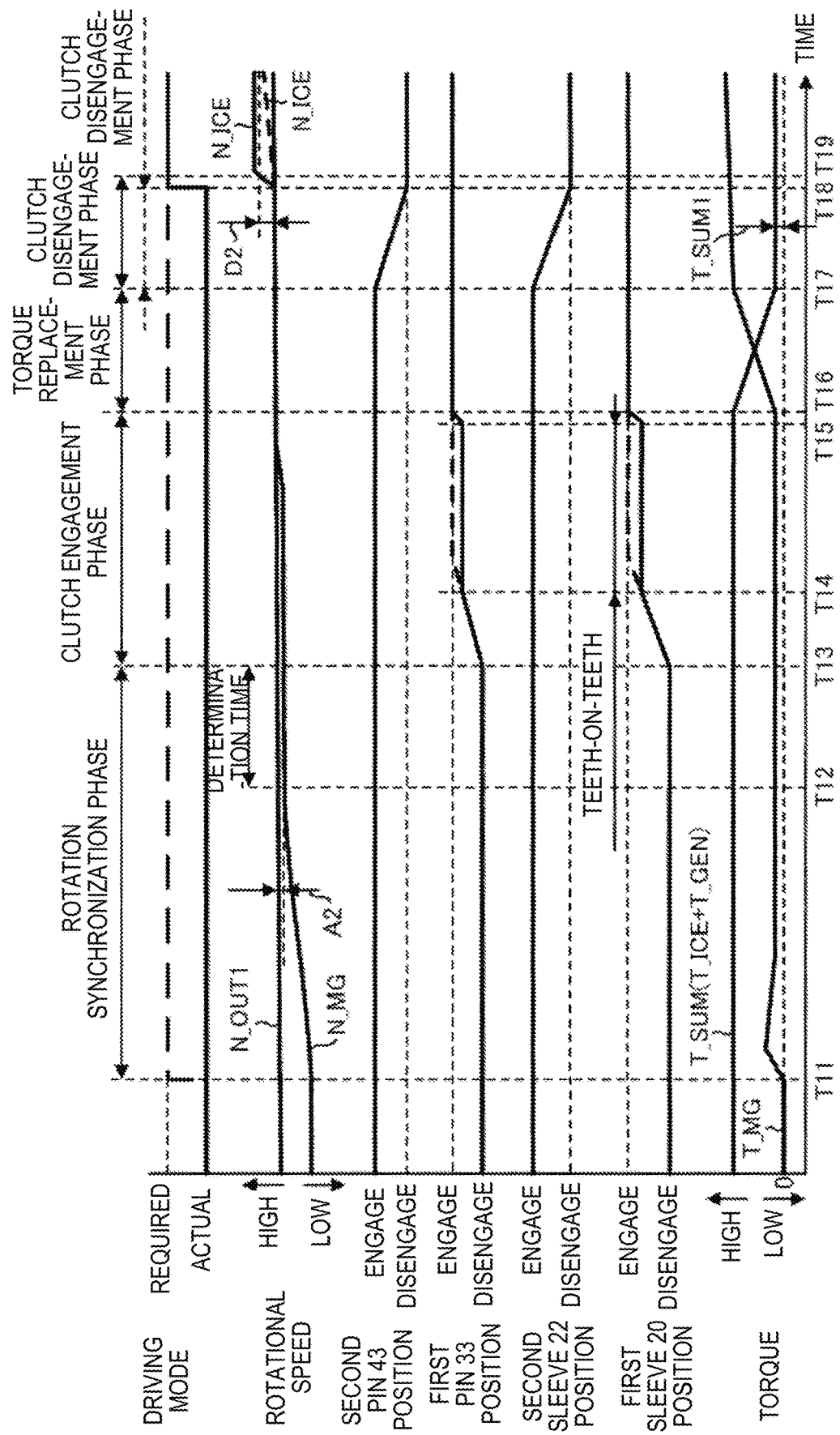
FIG. 15 is a diagram showing an example of a timing chart corresponding to FIG. 14.

FIG. 15 shows an example of a timing chart corresponding to the flowchart shown in FIG. 14. At timing T11, the driving operating point of the vehicle 1 moves from region R2 to region R1. Therefore, a request to shift the driving mode from the internal combustion engine direct connection mode to the series hybrid mode is generated, as indicated by the broken line.

At timing T11, rotation synchronization of the first clutch mechanism 19 is initiated in accordance with the driving mode transition request. As a result, the torque T_MG of the travel motor 2 increases and the rotational speed N_MG is brought close to a first output-side rotational speed N_OUT1. The first output-side rotational speed N_OUT1 is the rotational speed of the first reduction gear 8. Therefore, from timing T11, the rotation of the first sleeve 20 approaches the rotation of the first reduction gear 8.

At timing T12, the magnitude of the differential rotation of the first clutch mechanism 19, that is, the differential rotation between the first output-side rotational speed N_OUT1 and the rotational speed N_MG, becomes less than or equal to the second prescribed value A2, and stays less than or equal to the second prescribed value A2 until timing T13 when the determination time has elapsed. Therefore, at timing T13, the clutch engagement of the first clutch mechanism 19 is initiated, and the first pin 33 and the first sleeve 20 begin to move to the engagement side.

At timing T14, a teeth-on-teeth occurs in the first clutch mechanism 19, and the movement of the first sleeve 20 is hindered. In the present embodiment, the first spring 34 is not provided in the first shift mechanism 30, so that the movement of the first pin 33 also stops at timing T14.

The teeth-on-teeth is released at timing T15. As a result, the first sleeve 20 and the first pin 33 start to move to the engagement side again, and reach the engagement position at timing T16. Therefore, the magnitude of the differential rotation of the first clutch mechanism 19 becomes less than or equal to the prescribed value D1, and the clutch engagement control of the first clutch mechanism 19 is completed.

In this manner, if the first clutch mechanism 19 is engaged when the magnitude of the differential rotation of the first clutch mechanism 19 is less than or equal to the second prescribed value A2, the range of the detected differential rotation at this time does not overlap with the range of the detected differential rotation after clutch engagement. Therefore, in this case, it is not erroneously determined that the first clutch mechanism 19 has been engaged until the magnitude of the differential rotation of the first clutch mechanism 19 becomes less than or equal to the prescribed value D1 at timing T16.

From timing T16, torque replacement is performed in accordance with the completion of the clutch engagement control. In the torque replacement, the increase in the torque T_MG of the travel motor 2 and decrease in the torque T_SUM progress simultaneously. As a result, the drive torque of the vehicle 1 is gradually replaced from the torque T_SUM to the torque T_MG. The reduction in the torque T_SUM is basically caused by reduction in the torque T_ICE of the internal combustion engine 3.

The torque replacement is initiated by setting the target value of the torque T_SUM to be reduced to the prescribed value T_SUM1. This is because, in this example, the rotational speed N_ICE after the second clutch mechanism 21 is disengaged increases from the start of the release of the second clutch mechanism 21, in accordance with the power generation operation. As a result, at timing T17, when the torque replacement is completed, the torque T_SUM becomes the prescribed value T_SUM1.

At timing T17, the clutch disengagement control of the second clutch mechanism 21 starts in accordance with the completion of the torque replacement. In the present embodiment, since a second spring 44 is not provided in the second shift mechanism 40, the clutch disengagement control is performed after the torque replacement is completed, and the transmission torque of the second clutch mechanism 21 is reduced. As a result, from timing T17, the second pin 43 and the second sleeve 22 move in the disengagement direction.

The second pin 43 and the second sleeve 22 reach the disengaged position at timing T18. If the second clutch position sensor 52 is normal, the clutch disengagement control is completed when the second sleeve 22 is in the disengaged position. Therefore, in this case, the clutch disengagement control phase ends at timing T18.

In this example, the rotational speed N_ICE after disengagement of the second clutch mechanism 21 when the second clutch position sensor 52 is normal increases gradually, as indicated by the broken line, due to the power generation operation. In addition, when the second clutch position sensor 52 is normal, the target value of the torque T_SUM, which is reduced due to the torque replacement, is set to zero.

In this case, the differential rotation of the second clutch mechanism 21 is not sufficiently large after the second clutch mechanism 21 is disengaged. As a result, if the second clutch position sensor 52 were to fail, a disengagement of the second clutch mechanism 21 would not be adequately determined using the differential rotation.

In the present embodiment, if the second clutch position sensor 52 malfunctions, the torque T_SUM, which is reduced as a result of the torque replacement, is the prescribed value T_SUM1, as shown at timing T17. Therefore, when the second clutch mechanism 21 is disengaged at timing T18, the rotational speed N_ICE increases in accordance with the torque T_SUM, and the differential rotation of the second clutch mechanism 21 increases. As a result, the magnitude of the differential rotation of the second clutch mechanism 21 becomes greater than or equal to the prescribed value D2 at timing T19, and it is possible to complete the clutch disengagement control quickly after timing T18.

In this example, because the rotational speed N_ICE after disengagement of the second clutch mechanism 21 increases, the target value of the torque T_SUM that is reduced with the torque replacement is set to the positive side, that is, on the side greater than zero. As a result, the direction of change of the rotational speed N_ICE, which changes based on the torque T_SUM, is in the same direction as the direction of change of the rotational speed N_ICE that is required in the power generation operation. Therefore, the rotational speed N_ICE required in the power generation operation is achieved more rapidly than when in the opposite direction.

Next, the main action and effects of the present embodiment will be described.

In the present embodiment, the clutch control method for the vehicle 1 is used in the vehicle 1 comprising the second clutch mechanism 21, the second shift mechanism 40 that transmits clutch actuation force to the second clutch mechanism 21 without a spring, and the second clutch position sensor 52 that detects a disengagement of the second clutch mechanism 21. The clutch control method for the vehicle 1 comprises reducing the transmission torque of the second clutch mechanism 21 in order to execute a disengagement of the second clutch mechanism 21 by means of the second shift mechanism 40, determining a disengagement of the second clutch mechanism 21 based on the differential rotation of the second clutch mechanism 21 when the second clutch position sensor 52 fails, reducing the transmission torque of the second clutch mechanism 21, that is, the torque T_SUM, which is reduced when the second clutch mechanism 21 is disengaged, to the prescribed value T_SUM1 when the second clutch mechanism 21 fails, thereby decreasing to a larger absolute value than when the second clutch position sensor 52 is normal.

By means of such a method, the rotational speed N_ICE changes when the second clutch mechanism 21 is disengaged and the differential rotation of the second clutch mechanism 21 increases, so that a disengagement of the second clutch mechanism 21 can be accurately determined when the second clutch position sensor 52 fails.

In the present embodiment, the internal combustion engine 3 and the power generation motor 4, which constitute the generator, are provided on the upstream side of the second clutch mechanism 21 in the power transmission path 25 via the second clutch mechanism 21. The torque T_SUM that is reduced when the second clutch mechanism 21 is disengaged is reduced to the positive side when the rotational speed N_ICE is higher after disengagement of the second clutch mechanism 21 than at the time of the start of disengagement, and is reduced to the negative side when the rotational speed N_ICE is lower after disengagement of the second clutch mechanism 21 than at the time of the start of disengagement.

By this method, it is possible to change the rotational speed N_ICE in the same direction as the direction of change of the rotational speed N_ICE required in the power generation operation when the second clutch mechanism 21 is disengaged. Therefore, compared to the case of changing in the opposite direction, it is possible to quickly transition the rotational speed N_ICE after disengagement of the second clutch mechanism 21 to the rotational speed N_ICE required in the power generation operation.

If the first clutch position sensor 51 and the second clutch position sensor 52 have failed simultaneously, it is possible to determine an engagement of the dog clutch that is engaged after the driving mode transition, and then to determine a disengagement of the dog clutch that is disengaged after the driving mode transition.

As a result, in light of the fact that the clutch disengagement phase comes after the clutch engagement phase in the driving mode transition control, the engagement and disengagement of the dog clutch can be appropriately determined. The same applies to the fourth embodiment described further below.

The controller 7 may be configured as follows.

Figure 16:
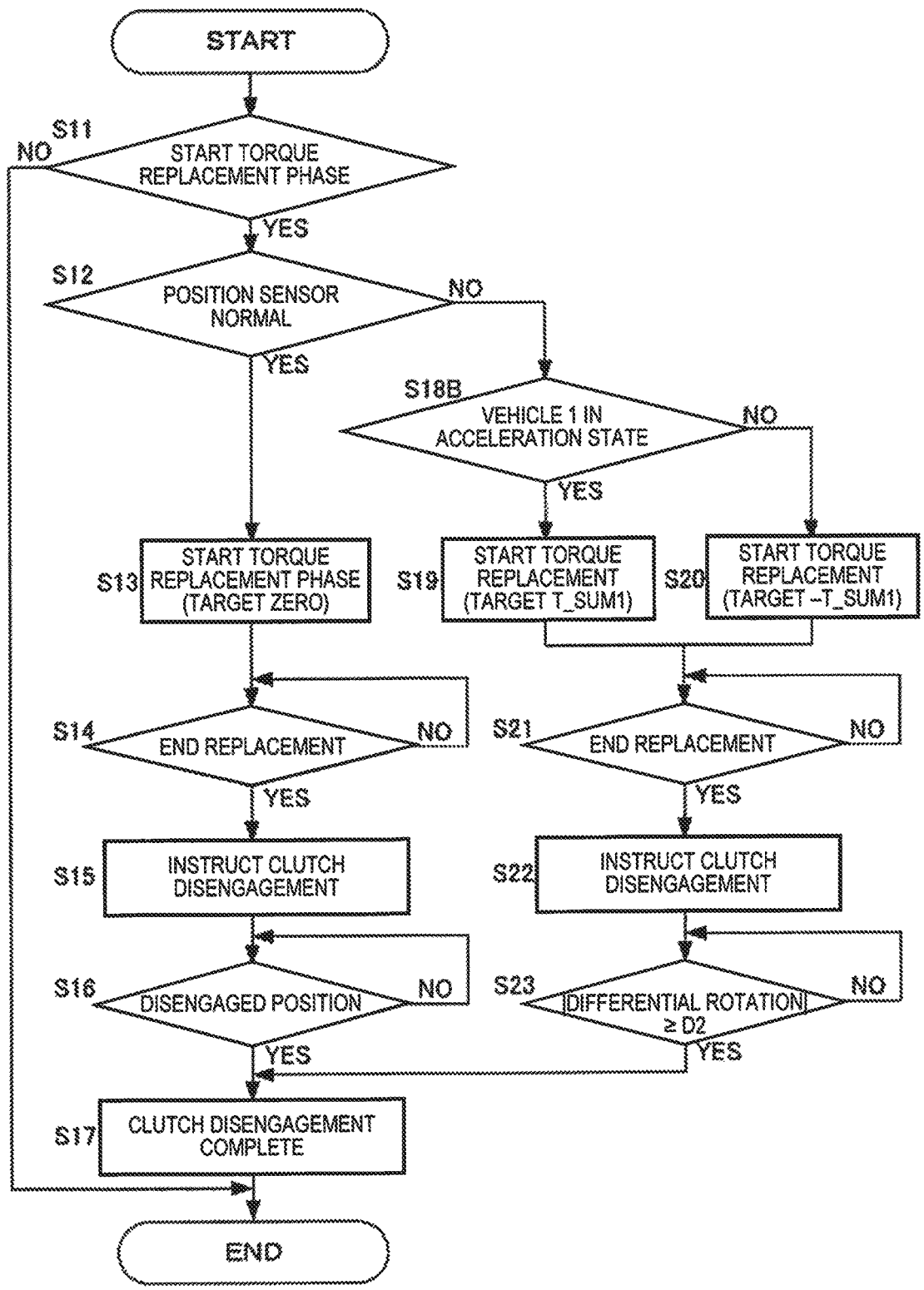
FIG. 16 is a flowchart showing an example of control of a modified example.

FIG. 16 is a flowchart showing control of a modified example of the present embodiment. The flowchart shown in FIG. 16 is the same as the flowchart shown in FIG. 15 except that Step S18B is provided instead of Step S18A. For this reason, the explanation below will primarily focus on Step S18B.

In Step S18B, the controller 7 determines whether the vehicle 1 is in a state of acceleration. Then, if the vehicle is in a state of acceleration, the target value of the transmission torque of the second clutch mechanism 21 to be reduced is set to the prescribed value T_SUM1 in order to initiate the torque replacement (Step S19), and when the vehicle is in a state of deceleration, the target value of the transmission torque of the second clutch mechanism 21 to be reduced is set to a negative value of the prescribed value T_SUM1 in order to initiate the torque replacement (Step S20).

In this case, when there is a shift to the series hybrid mode, the target value of the transmission torque of the second clutch mechanism 21 to be reduced is set in view of the fact that the rotational speed N_ICE required in the power generation operation increases in the acceleration state and the rotational speed N_ICE required in the power generation operation decreases in the deceleration state.

Therefore, even with such a method, the rotational speed N_ICE can be changed in the same direction as the direction of change of the rotational speed N_ICE required in the power generation operation when the second clutch mechanism 21 is disengaged. As a result, the rotational speed N_ICE after a disengagement of the second clutch mechanism 21 can be quickly shifted to the rotational speed N_ICE required in the power generation operation. In addition, it is possible to make it less likely that vehicle behavior change is felt when the second clutch mechanism 21 has yet to be disengaged.

Fourth Embodiment

The present invention is the same as the first embodiment except that the controller 7 is configured as described below. Thus, the first shift mechanism 30 includes the first spring 34, and the second shift mechanism 40 includes the second spring 44. Similar changes can also be applied to the second embodiment.

In the present embodiment, the controller 7 is configured to carry out the control described below when the dog clutch is disengaged. Hereinbelow, the second clutch mechanism 21 is described as an example of a dog clutch, but the same applies to the first clutch mechanism 19.

Figure 17:
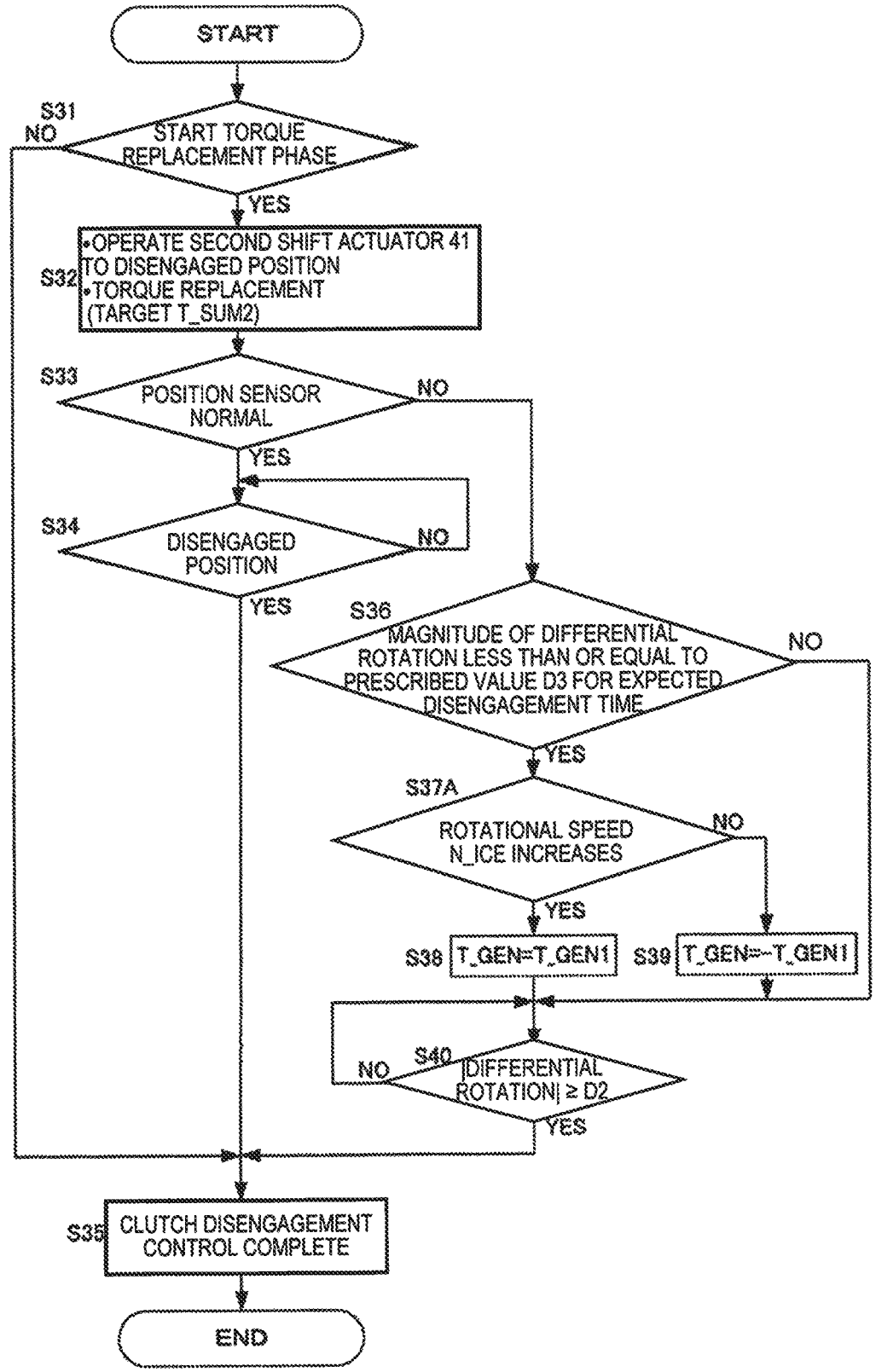
FIG. 17 is a flowchart showing an example of control of a fourth embodiment.

FIG. 17 is a flowchart showing an example of control performed by the controller 7 in the present embodiment. In Step S31, the controller 7 determines whether the torque replacement phase has started. In the case of a negative determination in Step S31, the process is temporarily ended, and in the case of a positive determination in Step S31, the process proceeds to Step S32.

In Step S32, the controller 7 operates the second shift actuator 41 to the disengaged position and sets the target value of the transmission torque of the second clutch mechanism 21 to be reduced at the time of disengagement to a prescribed value T_SUM2 and executes torque replacement.

That is, in the present embodiment, since the second shift mechanism 40 has the second spring 44, it is not necessary to actuate the second shift actuator 41 after the transmission torque of the second clutch mechanism 21 has decreased sufficiently when the second clutch mechanism 21 is disengaged. Therefore, in Step S32, the actuation of the second shift actuator 41 is started at the same time that torque replacement is initiated.

The prescribed value T_SUM2 is set to zero. This is because if the transmission torque is applied to the second clutch mechanism 21, a disengagement resistance force is generated, and it may not be possible to disengage the second clutch mechanism 21 due to the spring force of the second spring 44. The prescribed value T_SUM2 can be set to be greater than zero within a range in which the second clutch mechanism 21 can be disengaged by the spring force of the second spring 44 against the disengagement resistance force.

In Step S33, the controller 7 determines whether the second clutch position sensor 52 is normal. In the case of a positive determination in Step S33, the process proceeds to Step S34.

In Step S34, the controller 7 determines whether the second sleeve 22 is in the disengaged position. In the case of a negative determination in Step S34, the process returns to Step S34, and in the case of a positive determination in Step S34, the process proceeds to Step S35.

In Step S35, the controller 7 completes the clutch disengagement control of the second clutch mechanism 21. The process is temporarily ended after Step S35.

In the case of a negative determination in Step S33, the process proceeds to Step S36. In this case, the controller 7 determines whether the magnitude of the differential rotation of the second clutch mechanism 21 is less than or equal to a prescribed value D3 until the expected disengagement time elapses.

The expected disengagement time is the expected disengagement time of the second clutch mechanism 21 from the start of disengagement until the completion of disengagement, and is set in advance based on experiment, etc. For example, the expected disengagement time can be set to a time that exceeds the disengagement time when the disengagement of the second clutch mechanism 21 takes the greatest amount of time. The expected disengagement time corresponds to the prescribed period of time.

The prescribed value D3 is a value for determining the magnitude of the differential rotation during the expected disengagement time and is set to the measurement variability α, for example. In this case, since the differential rotation is zero while the second clutch mechanism 21 is not disengaged, the magnitude of the detected differential rotation is less than or equal to the measurement variability α, so that it is possible to determine that the second clutch mechanism 21 has not been disengaged.

The prescribed value D3 may be set to be greater than the measurement variability α. The prescribed value D3 may be set to be smaller than the prescribed value D2. As a result, if the magnitude of the differential rotation after the expected disengagement time has elapsed is less than or equal to the prescribed value D3, it can be determined that even though the second clutch mechanism 21 was disengaged, it is difficult for the differential rotation to increase due to the power generation operation.

In the case of a positive determination in Step S36, it is determined that the absolute value of the differential rotation of the second clutch mechanism 21 has not changed more than the prescribed value D3, and the process proceeds to Step S37A.

In Step S37A, the controller 7 determines whether the rotational speed N_ICE increases. In the case of a positive determination in Step S37A, the process proceeds to Step S38, and in the case of a negative determination in Step S37A, the process proceeds to Step S39.

In Step S38, the controller 7 sets the torque T_GEN of the power generation motor 4 to a prescribed value T_GEN1. The prescribed value T_GEN1 is a preset value greater than zero. As a result, in the case that the rotational speed N_ICE becomes high after the second clutch mechanism 21 is disengaged, the transmission torque of the second clutch mechanism 21, i.e., the torque T_SUM, is set to the positive side.

In Step S39, the controller 7 sets the torque T_GEN to the negative value of the prescribed value T_GEN1. As a result, in the case that the rotational speed N_ICE becomes low after the second clutch mechanism 21 is disengaged, the torque T_SUM is set to the negative side.

In Steps S38 and S39, when the absolute value of the differential rotation of the second clutch mechanism 21 does not change more than the prescribed value D3 even when the second clutch mechanism 21 is disengaged, the absolute value of the torque T_SUM is increased. After Steps S38 and S39, the process proceeds to Step S40. The process proceeds to Step S40 even in the case of a negative determination in Step S36.

In Step S40, the controller 7 determines whether the magnitude of the differential rotation of the second clutch mechanism 21 is greater than or equal to a prescribed value D2. In the case of a negative determination in Step S40, the process returns to Step S40, and in the case of a positive determination in Step S40, it is determined that the second clutch mechanism 21 has been disengaged, and the process proceeds to Step S35. As a result, the clutch disengagement control of the second clutch mechanism 21 is completed.

Figure 18:
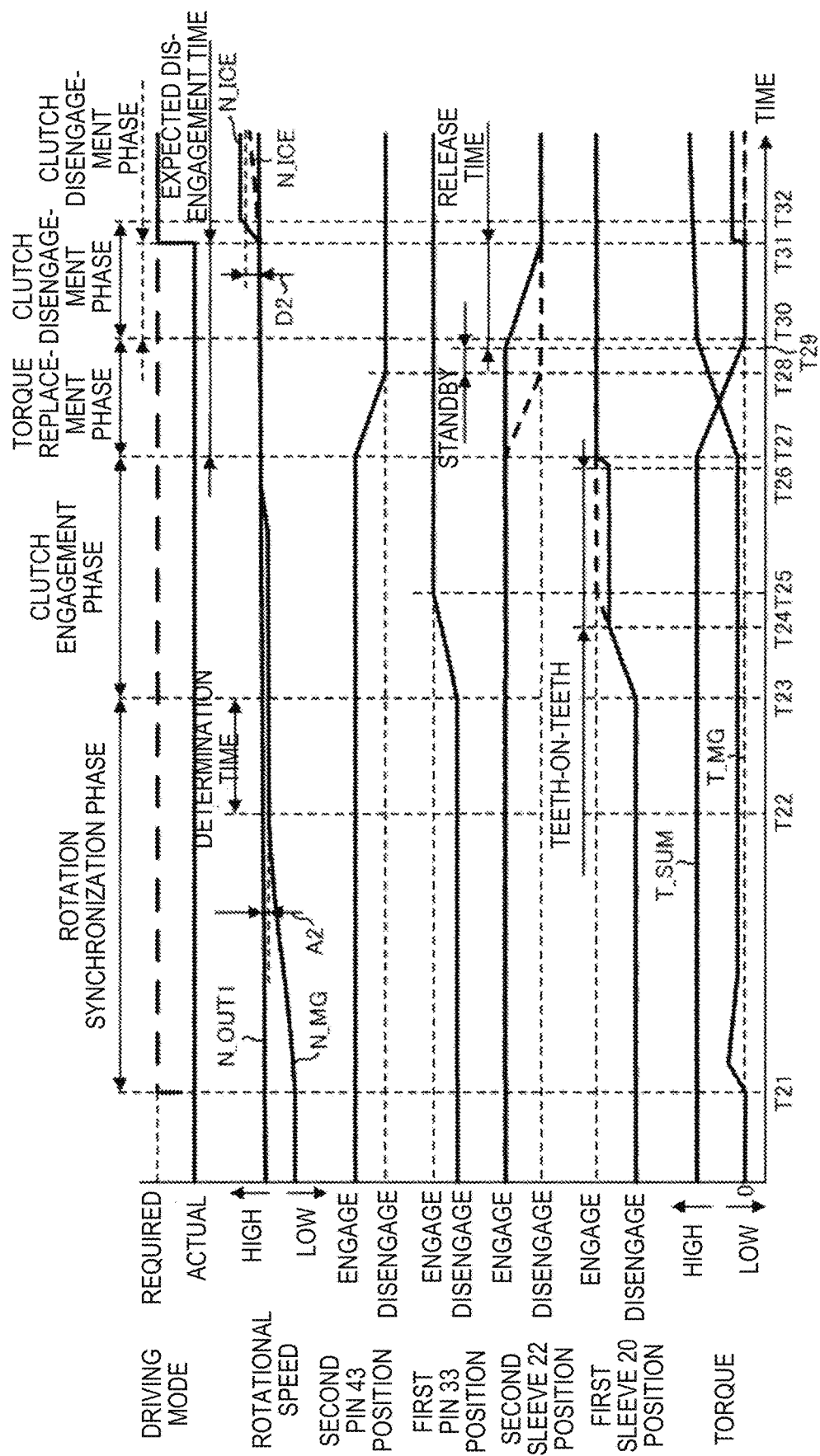
FIG. 18 is a diagram showing one example of a timing chart corresponding to FIG. 17.

FIG. 18 shows an example of a timing chart corresponding to the flowchart shown in FIG. 17. At timing T21, a request to shift the driving mode from the internal combustion engine direct connection mode to the series hybrid mode is generated, as indicated by the broken line, and rotation synchronization of the first clutch mechanism 19 is initiated in accordance with the driving mode transition request. As a result, the torque T_MG of the travel motor 2 increases.

The magnitude of the differential rotation of the first clutch mechanism 19 is less than or equal to the second prescribed value A2 from timing T22 to the timing T23 when the determination time has elapsed. Therefore, at timing T23, clutch engagement of the first clutch mechanism 19 is initiated and the first pin 33 and the first sleeve 20 begin to move to the engagement side.

At timing T24, a teeth-on-teeth occurs in the first clutch mechanism 19 and the movement of the first sleeve 20 is hindered. In the present embodiment, since the first shift mechanism 30 has the first spring 34, the first pin 33 continues to move to the engagement side from timing T24. The first pin 33 reaches the engaged position at timing T25.

The teeth-on-teeth is released at timing T26, and thus, the first sleeve 20 again begins moving toward the engagement side. The first sleeve 20 reaches the engaged position at timing T27. As a result, the differential rotation of the first clutch mechanism 19 becomes less than or equal to the prescribed value D1, and the clutch engagement control is completed.

In this case as well, since engagement of the first clutch mechanism 19 is executed when the magnitude of the differential rotation of the first clutch mechanism 19 is less than or equal to the second prescribed value A2, an erroneous determination that the first clutch mechanism 19 has been engaged is not made between timings T23 and T27.

From timing T27, torque replacement is initiated in accordance with the completion of the clutch engagement control of the first clutch mechanism 19, operation of the second shift actuator 41 to the disengaged position is begun, and the second pin 43 is moved to the disengagement side. The second sleeve 22 does not move until the torque T_SUM has decreased sufficiently, which allows the spring force of the second spring 44 to move the second sleeve 22 against the disengagement resistance force. Therefore, from timing T27, the second sleeve 22 does not move as shown by the broken line and remains in the engaged position.

At timing T28, the second pin 43 reaches the disengaged position. At timing T29, the torque T_SUM decreases sufficiently, and the second spring 44 begins to move the second sleeve 22 to the disengagement side against the disengagement resistance force. As a result, from timing T29, the second sleeve 22 begins to move to the disengagement side. The torque replacement ends at timing T30.

At timing T31, the second sleeve 22 reaches the disengaged position. Between timings T28 and T29 is the standby time for the second sleeve 22, and the time between timing T29 and timing T31 is the release time of the second sleeve 22. In this example, the expected disengagement time elapses at timing T31.

The torque T_SUM shown by the broken line indicates a case in which the second clutch position sensor 52 is normal. In this case, disengagement of the second clutch mechanism 21 is completed at timing T31, and the driving mode shifts to the series hybrid mode. The direction of change of the rotational speed N_ICE after disengagement of the second clutch mechanism 21, that is, the rotational speed N_ICE of the internal combustion engine 3 in which power generation operation is performed, becomes the upward direction.

In the case that the second clutch position sensor 52 is normal, the absolute value of the torque T_GEN of the power generation motor 4 is not increased after disengagement of the second sleeve 22. As a result, in this case, the rotational speed N_ICE increases gradually due to the power generation operation, as shown by the broken line, so that the differential rotation of the second clutch mechanism 21 increases with difficulty. Therefore, assuming that it is the time of failure of the second clutch position sensor 52, the magnitude of the differential rotation of the second clutch mechanism 21 would not immediately become greater than or equal to the prescribed value D2, and the disengagement determination of the second clutch mechanism 21 would not be appropriately made.

In the present embodiment, the magnitude of the differential rotation of the second clutch mechanism 21 becomes greater than the prescribed value D3 at timing T31, and the torque T_GEN of the power generation motor 4 is increased, resulting in an increase in the torque T_SUM. Therefore, the rotational speed N_ICE also increases from timing T31 to a greater extent than when the second clutch position sensor 52 is normal. As a result, the magnitude of the differential rotation of the second clutch mechanism 21 becomes greater than or equal to the prescribed value D2 at timing T32, and disengagement of the second clutch mechanism 21 is appropriately determined without significant delay from timing T31.

In this example, the absolute value of the torque T_SUM is increased at timing T31. In addition, since the rotational speed N_ICE after disengagement of the second clutch mechanism 21 increases, the torque T_SUM, the absolute value of which is increased, is set to the positive side, that is, greater than zero.

Thus, the rotational speed N_ICE changes in the same direction as the rotational speed N_ICE required in the power generation operation in accordance with the torque T_SUM, the absolute value of which is increased; therefore, the rotational speed N_ICE required in the power generation operation is achieved more quickly than when in the opposite direction.

Next, the main action and effects of the present embodiment will be described.

In the present embodiment, the clutch control method for the vehicle 1 is used in the vehicle 1 comprising the second clutch mechanism 21, the second shift mechanism 40 that transmits clutch actuation force to the second clutch mechanism 21 via the second spring 44, and the second clutch position sensor 52 that detects a disengagement of the second clutch mechanism 21. The clutch control method for the vehicle 1 comprises reducing the transmission torque of the second clutch mechanism 21, i.e., the torque T_SUM, in order to execute a disengagement of the second clutch mechanism 21 by means of the second shift mechanism 40, determining a disengagement of the second clutch mechanism 21 based on differential rotation of the second clutch mechanism 21 when the second clutch position sensor 52 fails, and increasing the absolute value of the torque T_SUM when the absolute value of the differential rotation of the second clutch mechanism 21 does not change more than the prescribed value D2 even when the second clutch mechanism 21 is disengaged at the time of failure of the second clutch position sensor 52.

By such a method, the differential rotation of the second clutch mechanism 21 can be increased even if it is difficult for the differential rotation of the second clutch mechanism 21 to increase after disengagement of the second clutch mechanism 21. Therefore, disengagement of the second clutch mechanism 21 can be accurately determined at the time of failure of the second clutch position sensor 52.

The controller 7 may be configured as follows.

Figure 19:
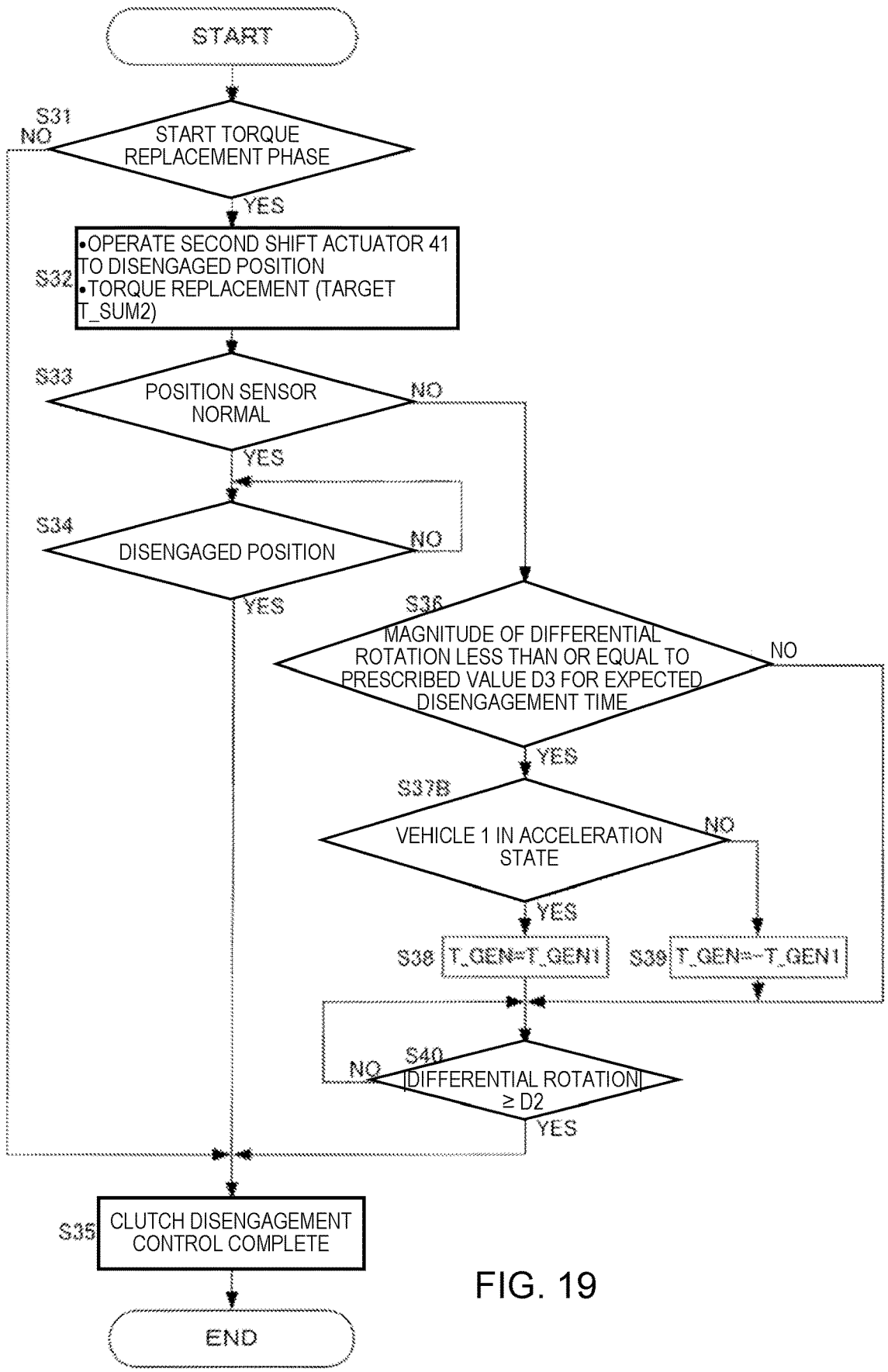
FIG. 19 is a flowchart showing an example of control of a first modified example.

FIG. 19 shows a flowchart of the control process of a modified example of the present embodiment. The flowchart of FIG. 19 is the same as the flowchart shown in FIG. 17 except that Step S37B is provided instead of Step S37A. For this reason, the explanation below will primarily focus on Step S37B.

In Step S37B, the controller 7 determines whether the vehicle 1 is in a state of acceleration. Then, if the vehicle is in a state of acceleration, the torque T_GEN of the power generation motor 4 is set to the prescribed value T_GEN1 (Step S38), and if the vehicle is in a state of deceleration, the torque T_GEN is set to a negative value of the prescribed value T_GEN1 (Step S39).

In this case, when there is a shift to the series hybrid mode, the torque T_GEN of the power generation motor 4 is set in anticipation that the rotational speed N_ICE required in the power generation operation increases in the acceleration state and that the rotational speed N_ICE required in the power generation operation decreases in the deceleration state.

Therefore, even with such a method, it is possible to change the rotational speed N_ICE, in accordance with the torque T_SUM, in the same direction as the rotational speed N_ICE required in the power generation operation when the second clutch mechanism 21 is disengaged. As a result, it is possible to quickly transition the rotational speed N_ICE after disengagement of the second clutch mechanism 21 to the rotational speed N_ICE required in the power generation operation. In addition, it is possible to make it less likely that vehicle behavior change is felt when the second clutch mechanism 21 has yet to be disengaged.

The control to increase the absolute value of the torque T_SUM when the absolute value of the differential rotation of the second clutch mechanism 21 does not change more than the prescribed value D2 even when the second clutch mechanism 21 is disengaged may be applied to the third embodiment.

In this case, the absolute value of the torque T_SUM can be increased in order to increase the differential rotation, when the differential rotation of the second clutch does not increase sufficiently, even when the second clutch mechanism 21 is disengaged, and even though the transmission torque of the second clutch mechanism 21 to be reduced is reduced to the prescribed value T_SUM1. Therefore, in this case, the reliability of the disengagement determination of the second clutch mechanism 21 is improved.

Embodiments of the present invention were described above, but the above-described embodiments illustrate only some of the examples of the implementation of the present invention and are not intended to limit the technical scope of the present invention to the specific configurations of the above-described embodiments.

For example, in the embodiments described above, cases in which the controller 7 is realized by a single controller were described, but the controller 7 can be composed of a plurality of controllers.

The invention claimed is:

1. A clutch control method for a vehicle having a dog clutch and an engagement sensor that detects an engagement of the dog clutch, the clutch control method comprising:
   determining whether the engagement sensor is normal or has failed;
   when the engagement sensor is determined to be normal, executing the engagement of the dog clutch by
      setting a target value of a magnitude of a differential rotation of the dog clutch to a first prescribed value
      starting the engagement of the dog clutch upon determining that the magnitude of the differential rotation is equal to or smaller than the first prescribed value,
      determining whether the engagement of the dog clutch is completed by using the engagement sensor; and
   when the engagement sensor is determined to have failed, executing the engagement of the dog clutch by
      setting the target value to a second prescribed value that is larger than the first prescribed value,
      starting the engagement of the dog clutch upon determining that the magnitude of the differential rotation is equal to or smaller than the second prescribed value, and
      determining that the engagement of the dog clutch is completed when the magnitude of the differential rotation is equal to or smaller than a third prescribed value, the third prescribed value being a judgement value set in advance for determining whether the engagement of the dog clutch is complete.

2. The clutch control method according to claim 1, wherein
   the second prescribed value is obtained by increasing the first prescribed value to a value greater than a variation range of the differential rotation after the dog clutch is meshed.

3. The clutch control method according to claim 1, wherein
   during acceleration of the vehicle, the dog clutch is engaged when a rotational speed of an upstream-side engagement element of the dog clutch is higher than a rotational speed of a downstream-side engagement element in a power transmission path via the dog clutch, and
   during deceleration of the vehicle, the dog clutch is engaged when the rotational speed of the upstream-side engagement element is lower than the rotational speed of the downstream-side engagement element in the power transmission path via the dog clutch.

4. A clutch control device for a vehicle having a dog clutch and an engagement sensor that detects an engagement of the dog clutch, the clutch control device comprising:
   a controller configured to:
   determine whether the engagement sensor is normal or has failed;
   when the engagement sensor is determined to be normal, execute the engagement of the dog clutch by
      setting a target value of a magnitude of a differential rotation of the dog clutch to a first prescribed value
      starting the engagement of the dog clutch upon determining that the magnitude of the differential rotation is equal to or smaller than the first prescribed value, and
      determining whether the engagement of the dog clutch is completed by using the engagement sensor; and
   when the engagement sensor is determined to have failed, executing the engagement of the dog clutch by
      setting the target value to a second prescribed value that is larger than the first prescribed value,
      starting the engagement of the dog clutch upon determining that the magnitude of the differential rotation is equal to or smaller than the second prescribed value, and
      determining that the engagement of the dog clutch is completed when the magnitude of the differential rotation is equal to or smaller than a third prescribed value, the third prescribed value being a judgement value set in advance for determining whether the engagement of the dog clutch is complete.

* * * * *